US012436950B1

(12) United States Patent
Haynes et al.

(10) Patent No.: US 12,436,950 B1
(45) Date of Patent: Oct. 7, 2025

(54) MACHINE LEARNING ACCELERATED SEMANTIC EQUIVALENCE DETECTION

(71) Applicant: Microsoft Technology Licensing, LLC, Redmond, WA (US)

(72) Inventors: Brandon Barry Haynes, Seattle, WA (US); Rana Bijad M Alotaibi, Redmond, WA (US); Anna Pavlenko, Edmonds, WA (US); Yuanyuan Tian, San Jose, CA (US); Jyoti Leeka, Sunnyvale, CA (US); Alekh Jindal, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/622,857

(22) Filed: Mar. 29, 2024

(51) Int. Cl.
*G06F 16/00* (2019.01)
*G06F 16/2453* (2019.01)
*G06N 5/01* (2023.01)

(52) U.S. Cl.
CPC ......... *G06F 16/24542* (2019.01); *G06N 5/01* (2023.01)

(58) Field of Classification Search
CPC ......... G06F 16/24542; G06F 16/24537; G06F 16/24539
USPC ....................................................... 707/718
See application file for complete search history.

(56) References Cited

U.S. PATENT DOCUMENTS

2020/0065420 A1*  2/2020  Scodary .............. G06F 16/9535
2020/0201860 A1*  6/2020  Vogelsgesang ... G06F 16/24537

OTHER PUBLICATIONS

Yuan, et al., "Automatic View Generation with Deep Learning and Reinforcement Learning", 2020 IEEE 36th International Conference on Data Engineering (ICDE), Apr. 24, 2020, pp. 94-107.
Zhou, et al., "Automated verification of query equivalence using satisfiability modulo theories", Proceedings of the VLDB Endowment, vol. 12, Issue 11, Jul. 1, 2019, pp. 1276-1288.
Zhou, et al., "Scope: parallel databases meet MapReduce", The VLDB Journal, vol. 21, Jun. 28, 2012, pp. 611-636.
Zhou, et al., "SPES: A Symbolic Approach to Proving Query Equivalence Under Bag Semantics", 2022 IEEE 38th International Conference on Data Engineering (ICDE), May 12, 2022, pp. 1276-1288.

(Continued)

*Primary Examiner* — Chelcie L Daye
(74) *Attorney, Agent, or Firm* — Barta Jones, PLLC

(57) ABSTRACT

Examples detect equivalent subexpressions within a computational workload. Examples include converting a query plan tree associated with a first subexpression into a matrix. The first subexpression is a portion of a database query from the computational workload. Each node in the query plan tree is represented as a row of the matrix. The matrix is converted into a first vector. The first subexpression is determined to be equivalent to a second subexpression by comparing the first vector to a second vector associated with the second subexpression. The comparison includes computing a distance between the first and second vectors that is lower than a distance threshold. The computational workload is modified, based on the determining, to perform the first subexpression and exclude performance of the second subexpression as duplicative.

20 Claims, 11 Drawing Sheets

(56) References Cited

OTHER PUBLICATIONS

Zhu, et al., "Introduction to semi-supervised learning", Synthesis lectures on artificial intelligence and machine learning, vol. 3, Issue 1, 2009, Retrieved from: https://link.springer.com/book/10.1007/978-3-031-01548-9, pp. 1-11.
Zhu, et al., "KEA: Tuning an Exabyte-Scale Data Infrastructure", Proceedings of the 2021 International Conference on Management of Data, Jun. 18, 2021, pp. 2667-2680.
"Amazon Redshift" Retrieved from: https://docs.aws.amazon.com/redshift/latest/dg/welcome.html, 2023, 2 pages.
"Azure Synapse Analytics", Retrieved from: https://azure.microsoft.com/en-us/products/synapse-analytics, Microsoft, 2023, 7 pages.
"Cloud data warehouse to power your data-driven innovation", BigQuery, Retrieved from: https://cloud.google.com/bigquery, 2024, 19 Pages.
"The foundation for your next high-performance database" Retrieved from: https://calcite.apache.org, Apache Software Foundation, 2023, 2 pages.
"Unified engine for large-scale data analytics" Retrieved from: https://spark.apache.org, Apache Software Foundation, 2023, 9 pages.
Abiteboul, et al., "Foundations of Databases", Anthology, vol. 8, Issue 1, 1995, 46 Pages.
Agiwal, et al., "Napa: Powering Scalable Data Warehousing with Robust Query Performance at Google", Proceedings of the VLDB Endowment (PVLDB), vol. 14, Issue 12, 2021, pp. 2986-2998.
Agrawal, et al., "Automated selection of materialized views and indexes in SQL databases." VLDB, vol. 2000, 2000, pp. 496-505.
Ahmed, et al., "Automated generation of materialized views in Oracle", Proceedings of the VLDB Endowment, vol. 13, Issue. 12, Aug. 1, 2020, pp. 3046-3058.
Alin Deutsch, et al., "FOL Modeling of Integrity Constraints (Dependencies)", In Encyclopedia of Database Systems, Second Edition, 2009, pp. 1-7.
Alon Y Halevy, et al., "Answering queries using views: A survey", The VLDB Journal, vol. 10, Dec. 2001, pp. 270-294.
Chirkova, et al., "Materialized Views", Foundations and Trends® in Databases, vol. 4, Issue. 4, Dec. 14, 2012, pp. 295-405.
Christine Paulin-Mohring, "Introduction to the Coq Proof-Assistant for Practical Software Verification", Laser Summer School on Software Engineering, vol. 7682, 2011, pp. 45-95.
Chu, et al., "Axiomatic Foundations and Algorithms for Deciding Semantic Equivalences of SQL Queries", VLDB, vol. 11, May 24, 2018, pp. 1482-1495.
Chu, et al., "HoTTSQL: proving query rewrites with univalent SQL semantics", ACM SIGPLAN Notices, vol. 52, Issue 6, Jun. 14, 2017, pp. 510-524.
Dageville, et al., "The Snowflake Elastic Data Warehouse", Proceedings of the 2016 International Conference on Management of Data, Jun. 14, 2016, pp. 215-226.
Dong, et al., "DeepJoin: Joinable Table Discovery with Pre-trained Language Models", arXiv preprint arXiv:2212.07588, Jun. 23, 2023, pp. 1-13.
Ebner, et al., "A metaprogramming framework for formal verification", Proceedings of the ACM on Programming Languages, vol. 1, Issue 1, Article No. 34, Aug. 29, 2017, pp. 1-29.
Goetz Graefe, et al., "The Cascades Framework for Query Optimization", IEEE Data Eng. Bull, vol. 18, Issue. 3, 1995, pp. 19-29.
Goldstein, et al., "Optimizing queries using materialized views: a practical, scalable solution", ACM SIGMOD Record, vol. 30, Issue. 2, May 1, 2001, pp. 331-342.
Goodfellow, et al., "Deep Learning", MIT press, 2016. pp. 1- 767.
Graefe, et al., "The Volcano optimizer generator: extensibility and efficient search", Proceedings of IEEE 9th International Conference on Data Engineering, 1993, pp. 209-218.
Gupta, et al., "Amazon Redshift and the Case for Simpler Data Warehouses", Proceedings of the 2015 ACM SIGMOD International Conference on Management of Data, May 27, 2015, pp. 1917-1923.
Hayek, et al., "Improved Cardinality Estimation by Learning Queries Containment Rates", arXiv preprint arXiv: 1908.07723, Aug. 21, 2019, pp. 1-14.
Haynes, et al., "GEqO: ML-Accelerated Semantic Equivalence Detection", ACM Digital Library, vol. 1, Issue 4, Dec. 12, 2023, 25 pages.
Huang, et al., "Query-aware locality-sensitive hashing for approximate nearest neighbor search", Proceedings of the VLDB Endowment, vol. 9, Issue 01, Sep. 1, 2015, pp. 1-12.
Ioannidis, et al., "Containment of Conjunctive Queries: Beyond Relations as Sets", ACM Transactions on Database Systems, vol. 20, Issue. 3, Sep. 1995, pp. 288-324.
Jayram, et al., "The containment problem for <bi>Real</bi> conjunctive queries with inequalities", Proceedings of the twenty-fifth ACM SIGMOD-SIGACT-SIGART symposium on Principles of database systems, Jun. 26, 2006, pp. 80-89.
Jindal, et al., "Computation Reuse in Analytics Job Service at Microsoft", Proceedings of the 2018 International Conference on Management of Data, May 27, 2018, pp. 191-203.
Jindal, et al., "Production Experiences from Computation Reuse at Microsoft", Published in Proceedings of the 24th International Conference on Extending Database Technology (EDBT), Mar. 23-26, 2021, pp. 623-634.
Jindal, et al., "Selecting subexpressions to materialize at datacenter scale", Proceedings of the VLDB Endowment, vol. 11, Issue 7, Mar. 1, 2018, pp. 800-812.
Kingma, et al., "Adam: A Method for Stochastic Optimization", arXiv preprint arXiv: 1412.6980, Jan. 30, 2017, pp. 1-15.
Liu, et al., "Automatic detection of performance bugs in database systems using equivalent queries", Proceedings of the 44th International Conference on Software Engineering, Jul. 5, 2022, pp. 225-236.
Malkov, et al., "Efficient and Robust Approximate Nearest Neighbor Search Using Hierarchical Navigable Small World Graphs", IEEE, vol. 42, Issue 4, Apr. 1, 2020, pp. 824-836.
Marcus, et al., "Bao: Making Learned Query Optimization Practical", Proceedings of the 2021 International Conference on Management of Data, Jun. 18, 2021, pp. 1275-1288.
Marcus, et al., "Neo: A Learned Query Optimizer", arXiv preprint arXiv:1904.03711, Apr. 7, 2019, pp. 1-18.
Mou, et al., "Convolutional Neural Networks over Tree Structures for Programming Language Processing", Proceedings of the AAAI Conference on Artificial Intelligence, vol. 30, Issue. 1, Feb. 21, 2016, pp. 1287-1293.
Moura, et al., "The Lean Theorem Prover (System Description)", Automated Deduction—CADE-25, vol. 9195, Jan. 1, 2015, pp. 378-388.
Moura, et al., "Z3: An Efficient SMT Solver", Tools and Algorithms for the Construction and Analysis of Systems, 2008, pp. 337-340.
Negi, et al., "Steering Query Optimizers: A Practical Take on Big Data Workloads", Proceedings of the 2021 International Conference on Management of Data, Jun. 18, 2021, pp. 2557-2569.
Ortiz, et al., "An Empirical Analysis of Deep Learning for Cardinality Estimation", arXiv preprint arXiv:1905.06425, Sep. 12, 2019, pp. 1-17.
Paszke, et al., "PyTorch: An Imperative Style, High-Performance Deep Learning Library", Advances in Neural Information Processing Systems 32, 2019, pp. 1-12.
Qin, et al., "High-Dimensional Similarity Query Processing for Data Science", Proceedings of the 27th ACM SIGKDD Conference on Knowledge Discovery & Data Mining, Aug. 14, 2021, pp. 4062-4063.
Sara Cohen, "Equivalence of queries combining set and bag-set semantics", Proceedings of the twenty-fifth ACM SIGMOD-SIGACT-SIGART symposium on Principles of database systems, Jun. 26, 2006, pp. 70-79.
Tate, et al., "Equality saturation: a new approach to optimization", Proceedings of the 36th annual ACM SIGPLAN-SIGACT symposium on Principles of programming languages, Jan, 21, 2009, pp. 264-276.
Timos, K. Sellis, "Multiple-query optimization", ACM Transactions on Database Systems, vol. 13, Issue 1, Mar. 1, 1988, pp. 23-52.

(56) References Cited

OTHER PUBLICATIONS

Tin Kam Ho, "Random decision forests", Proceedings of 3rd International Conference on Document Analysis and Recognition, vol. 1, 1995, pp. 278-282.
Tu, et al., "Multi-Query Optimization Revisited: A Full-Query Algebraic Method", 2022 IEEE International Conference on Big Data (Big Data), Dec. 17, 2022, pp. 252-261.
Vaswani, et al., "Attention is All you Need", Advances in Neural Information Processing Systems 30, 2017, pp. 5998-6008.
Wang, et al., "WeTune: Automatic Discovery and Verification of Query Rewrite Rules", Proceedings of the 2022 International Conference on Management of Data, Jun. 11, 2022, pp. 94-107.
Extended European search report received for European Application No. 25165632.8, mailed on Jun. 23, 2025, 09 pages.

\* cited by examiner

US 12,436,950 B1

MACHINE LEARNING ACCELERATED SEMANTIC EQUIVALENCE DETECTION

BACKGROUND

Large scale analytics engines have become a core dependency for modern data-driven enterprises to derive business insights and drive actions. These engines support many analytic jobs processing huge volumes of data daily, and workloads are often inundated with overlapping computations across multiple jobs. Reusing common computation is useful for efficient cluster resource utilization and reducing job execution time. Detecting common computation is crucial for reducing this computational redundancy. However, detecting equivalence on large-scale analytics engines is complex. Further, existing solutions for detecting equivalence at only the syntactic level are insufficient.

SUMMARY

The disclosed examples are described in detail below with reference to the accompanying drawing figures listed below. The following summary is provided to illustrate some examples disclosed herein. The following is not meant, however, to limit all examples to any particular configuration or sequence of operations.

Example solutions for detecting equivalent subexpressions within a computational workload include: converting a query plan tree associated with a first subexpression into a matrix, the first subexpression being a portion of a database query from the computational workload, each node in the query plan tree being represented as a row of the matrix; converting the matrix into a first vector; determining that the first subexpression is equivalent to a second subexpression by comparing the first vector to a second vector associated with the second subexpression, the comparing including computing a distance between the first and second vectors that is lower than a distance threshold; and modifying the computational workload, based on the determining, to perform the first subexpression and exclude performance of the second subexpression as duplicative.

BRIEF DESCRIPTION OF THE DRAWINGS

The disclosed examples are described in detail below with reference to the accompanying drawing figures listed below.

Corresponding reference characters indicate corresponding parts throughout the drawings. Any of the figures may be combined into a single example or embodiment.

DETAILED DESCRIPTION

Figure 1:
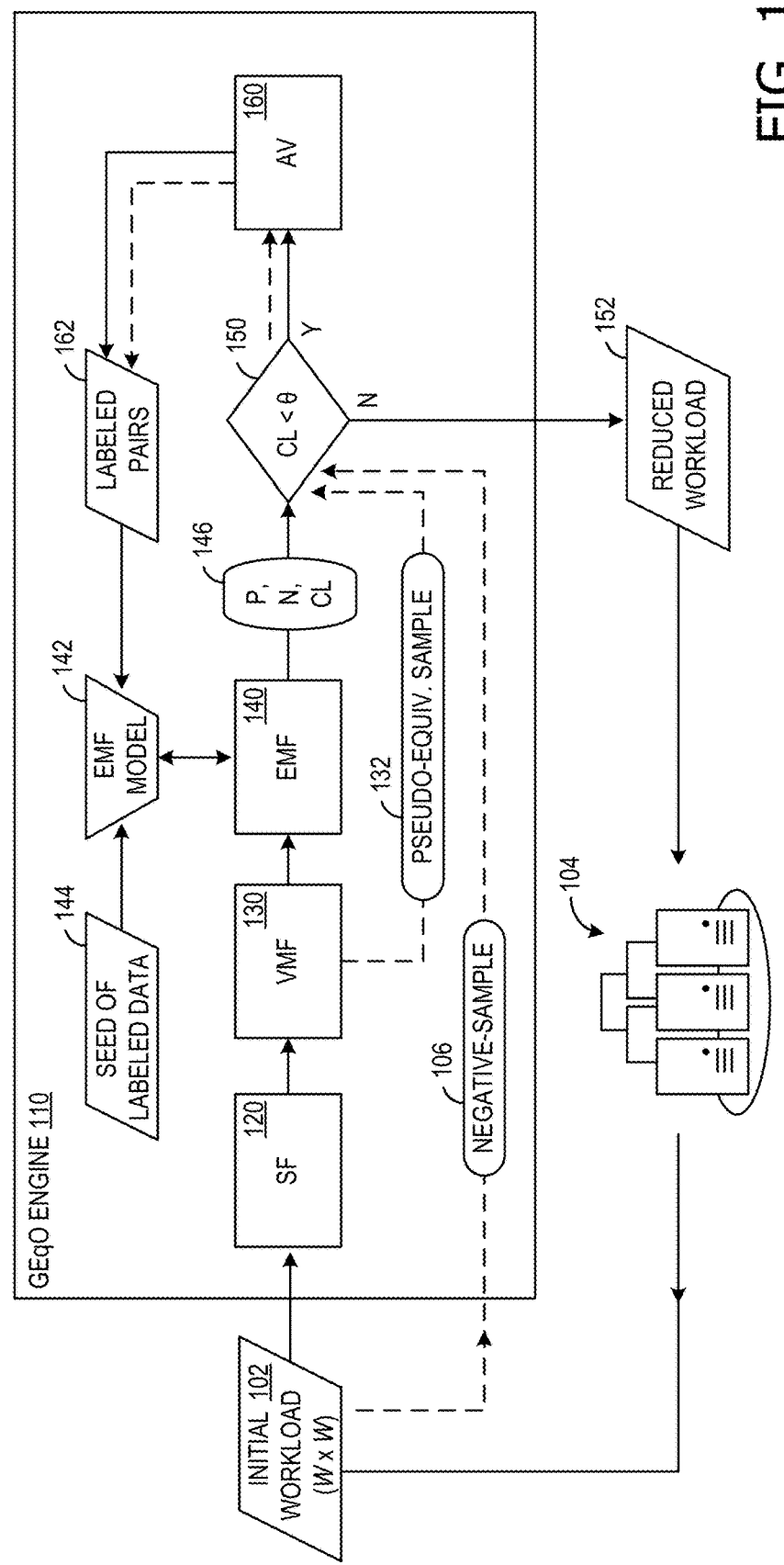
FIG. 1 is an architectural diagram illustrating an example equivalence detection system that is configured to detect equivalent subexpressions in a workload using semantic and syntactic techniques.

Modern data-driven enterprises often rely on large-scale analytics engines to derive business insights and derive actions. Some such engines process exabytes of data and execute millions of jobs, with trillions of operators per cluster. Computational redundancy within these analytics engines can be quite common, where intermediate results are duplicated across different queries (e.g., containing equivalent subexpressions). Because of this pervasive redundancy, identifying and reusing common computation is an important technique to improve query performance and reduce operational costs. For such tools and techniques, detecting equivalent subexpressions is the first and significant step. For example, view selection algorithms maximize the benefit of materializing computation that is most redundant in cost or frequency of use, under a storage or maintenance cost constraint. Similarly, view matching relies on detecting and leveraging equivalent views to improve query performance. At the query level, identifying equivalence is also a significant step in efficient rewriting (either automatically by an optimizer or manually by a database administrator), where a query is transformed into an equivalent—but better-performing—variant. Finally, determining query equivalence is also important in generating functional or performance tests for database implementations.

There are several technical problems in detecting subexpression equivalence at scale. For example, automating the detection process is beneficial due to the sheer number of developers and jobs involved. In another example, scalability is important as quadratic pairwise comparison over trillions of subexpressions is intractable in most current solutions. In another example, to maximize computation reuse, equivalence detection should be sufficiently general to identify common computation expressed in different ways by different users.

Existing approaches to detecting subexpression equivalence do not address many of these technical problems. Optimizer-based approaches, which are used by many classical materialized view selection and matching algorithms, typically defer to the query optimizer to detect equivalence. This approach lacks generality, given that even highly mature optimizers such as SQL Server are missing equivalence rules that can identify common scenarios. Such an approach is also inefficient given cloud-scale volumes of complex queries, where the query optimizer quickly becomes a bottleneck. Manual approaches, commonly used in many relational online analytical processing (OLAP) databases typically require users to manually identify common computations and create materialized views, which is error-prone, tedious, and does not scale. Some signature-based view materialization approaches use Merkle tree-like signatures for efficient identification of syntactically identical subexpressions. However, this approach sacrifices completeness as it may miss opportunities for identifying semantically equivalent subexpressions. Verification-based approaches formally prove the semantic equivalence of queries using automated proof assistants or SMT solvers. While these approaches are highly effective, they suffer from scalability issues. Exhaustively evaluating all pairs of subexpressions over a single day of jobs at cloud-scale might require over a trillion expensive formal verifications and an infeasible of compute time.

To address these and other technical problems, a general equivalence optimizer (GEqO) engine is provided herein as a technical solution. The GEqO engine goes beyond identifying superficially or syntactically equivalent subexpressions. The GEqO engine also detects semantic equivalence between subexpressions with dissimilar structures. In examples, the GEqO engine is configured to detect subexpression equivalence at scale. More specifically, the GEqO engine applies a series of equivalence filters to sets of subexpressions, enabling accelerated detection. To ensure correctness, the GEqO engine finally applies an expensive formal verifier, but after filtering most nonequivalent subexpressions, which constitute the vast majority of the pairs. As a result, the GEqO engine produces subexpression pairs that are, with perfect precision and near-perfect recall, semantically equivalent.

A desirable equivalence filter has two important properties: it should (i) admit virtually all of the equivalences (e.g., exhibit a high true positive rate (TPR)) and (ii) reject most non-equivalences (e.g., have a high true negative rate (TNR)). To maximize performance, the GEqO engine arranges filters to rapidly reject "easy" nonequivalent subexpression pairs, with faster filters applied first. Slower but increasingly complex filters are then applied to identify more difficult cases. This trade-off allows the GEqO engine to achieve performance close to optimal compared to an oracle that verifies only equivalent pairs, and is almost 200 times faster than verifying all subexpression pairs.

Example solutions facilitate eliminating redundant computations and database query requests in a computational workload by identifying equivalent subexpressions within a set of database queries. The GEqO engine implements a series of filters, in increasing complexity, that are used to identify equivalent subexpressions. Particularly, a vector matching filter analyzes two subexpressions by generating query plan trees (tree-based representations of the subexpressions) and converting each of those query plan trees into a matrix, where each node in the query plan tree is represented as a row of the matrix. Each of these matrices are reduced into fixed-length vectors, allowing them to be compared against each other. The GEqO engine determines that two subexpressions are equivalent by comparing the two vectors using a distance metric and comparing that distance to a predefined distance threshold. When two subexpressions are determined to be equivalent, the GEqO engine modifies the computational workload to perform only one of the subexpressions and to exclude the other as duplicative. This reduction in the workload allows the GEqO engine to improve computational performance by eliminating duplicative database queries or portions thereof.

The various examples are described in detail with reference to the accompanying drawings. Wherever preferable, the same reference number is used throughout the drawings to refer to the same or like part. References made throughout this disclosure relating to specific examples and implementations are provided solely for illustrative purposes but, unless indicated to the contrary, are not meant to limit all examples.

FIG. 1 is an architectural diagram illustrating an example equivalence detection system 100 that is configured to detect equivalent subexpressions in a workload using semantic and syntactic techniques. In examples, a computational environment 104 performs many data-driven analytic jobs, processing a large volume of data. These jobs, represented here as an initial workload 102, are often inundated with overlapping computations (e.g., where intermediate results are duplicated across different queries, as equivalent subexpressions). The computational environment 104 executes an optimization system (not separately shown) that detects equivalent subexpressions within the workload 102 and reuses common computations. As a part of this optimization, a general equivalence optimizer (GEqO) engine 110 is provided. This GEqO engine 110 is used to efficiently identify semantically equivalent subexpressions within the workload 102, thus reducing the initial workload 102 to a reduced workload 152 to improve performance of the computational environment.

As an example, consider the following two queries:

```
Query 1:
  SELECT y, AVG(x) from (
    SELECT A.x, B.y FROM A, B
    WHERE A.joinKey = B.joinKey
    AND A.val > B.val + 10
    AND B.val > 10
  )
Query 2:
  SELECT SUM(x), SUM(y) FROM (
    SELECT A.x, B.y FROM B, A
    WHERE B.joinKey = A.joinKey
    AND B.val + 10 < A.val
    AND B.val + 10 > 20
    AND A.val > 20
  )
```

Each of these queries contain an inner SELECT statement (e.g., a subexpression) that is syntactically different from each other (e.g., they do not have the exact same structure or form). However, it can be shown that these two subexpressions are semantically equivalent subexpressions, as they always generate the same result. While these two example queries are relatively simplistic, the detection of such semantic equivalence is non-trivial, particularly at scale.

In examples, the GEqO engine 110 applies a sequence of filters to rapidly reject "easy" nonequivalent subexpression pairs, with faster filters applied first. More specifically, the GEqO engine 110 includes a schema filter (SF) 120, a vector matching filter (VMF) 130, an equivalence model filter (EMF) 140, and an automated verifier (AV) 160 that are applied to the workload 102 in sequence. Slower but increasingly complex filters are applied, in sequence, to identify more difficult cases. This trade-off allows the GEqO engine 110 to achieve significantly increased performance, assuming an oracle that verifies only equivalent pairs, and is almost 200× faster than verifying all subexpression pairs.

The SF 120 performs a quick, but low-precision heuristic-based filter (e.g., matching common table and column sets). The VMF 130 embeds subexpressions in a learned vector space and identifies likely equivalent pairs by applying an approximate nearest neighbor search (ANNS). ANNS is a high-performance technique with moderate precision. As such, the GEqO engine 110 leverages the VMF 130 to efficiently prune moderately difficult cases not handled by the SF 120, while at the same time ensuring that equivalence pairs are admitted with high recall.

Next, the GEqO engine 110 uses the EMF 140 to utilize a high-precision, supervised machine-learning model (e.g., EMF model 142) trained over a workload sample to predict semantic equivalence. As discussed in further detail below, the EMF model 142 is database- and schema-agnostic and can be easily transferred to other workloads. After the EMF 140, there are positive pairs "P", negative pairs "N", and a confidence level "CL" (e.g., "P, N, CL" 146). If, at test 150, the confidence level is less than a threshold, θ, (e.g., due to new or evolving workloads), the GEqO engine 110 fine-tunes the EMF model 142 through an SSFL pipeline. Finally, a computationally expensive AV 160 provides a slow evaluation, but with perfect precision.

The below Table 1 illustrates performance of the GEqO engine 110 and its modules 120, 130, 140, 160 on a sample of approximately 50,000 subexpression pairs and 50 equivalences generated using a TPC-DS schema:

TABLE 1

Performance of GEqO engine 110 and filters

| Filter | Time (s) | TPR | TNR | Complexity |
|---|---|---|---|---|
| Schema Filter (SF) | 0.3 | 0.98 | 0.37 | $\mathcal{O}(n)$ |
| Vector Matching Filter (VMF) | 0.5 | 0.98 | 0.66 | $\mathcal{O}(n \log n)$ |
| Equivalence Model Filter (EMF) | 1.3 | 0.98 | 0.80 | $\mathcal{O}(n^3)$ |
| Automated Verifier (AV) | 898.5 | 1.00 | 1.00 | $\mathcal{O}(n \cdot 2^{\Omega(\gamma)})$ |
| GEqO Engine (overall) | 3.1 | 0.93 | 1.00 | $\mathcal{O}(\epsilon \cdot 2^{\Omega(\gamma)}) + \text{opt}$ |
| Oracle + AV | 1.0 | 1.00 | 1.00 | $\text{opt} = \mathcal{O}(|E| \cdot 2^{\Omega(\gamma)})$ |

Table 1 includes true positive rate (TPR) and true negative rate (TNR). The "Oracle+AV" row shows a hypothetical optimal case where an oracle correctly identifies all equivalent pairs, which are then verified. A verifier with perfect recall is assumed. n is the number of subexpressions, γ is the number of symbols in the AV's SAT formulation, and E is the set of equivalent subexpression pairs. The GEqO engine 110 verifies e more pairs than the oracle, which is empirically shown to be between approximately 5% and 10%. As such, Table 1 illustrates performance of the GEqO engine 110 and its associated filters (e.g., modules 120, 130, 140, 160), where the TPR is near-perfect, and the TNR steadily increases until all negatives have been eliminated.

One challenge in training the EMF model 142 is the use of large amounts of labeled data (shown in FIG. 1 as seed of labeled data 144). Although collecting query workloads may be much more accessible in the computing environment 104, labeling the equivalent subexpressions within the workload can be addressed by running expensive equivalence verifiers on all subexpression pairs (e.g., trillions of invocations). However, to reduce this computational cost, the GEqO engine 110 employs a semi-supervised feedback loop (SSFL) pipeline (represented in FIG. 1 in broken line) that iteratively improves the accuracy of the EMF model 142 until the model 142 matures. The SSFL pipeline employs less-expensive filters (e.g., the SF 120 and VMF 130) to ensure approximately balanced classes in its generated training data (shown in FIG. 1 as labeled pairs 162). This approach enables the GEqO engine 110 to both avoid the cold start training problem and fine-tune the EMF model 142 as new workload data becomes available for training.

A second challenge addressed by the GEqO engine 110 involves ensuring that the learned EMF model 142 is not tied to a fixed database schema. For example, the EMF model 142 is able to determine that the two subexpressions provided in the example queries above are equivalent even if the name of table 'A' is replaced with 'C'. The GEqO engine 110 uses a database- and schema-agnostic approach that focuses on learning general semantic equivalence patterns. This is accomplished during EMF featurization by replacing references to database schema with symbolic correspondences. This allows the GEqO engine 110 to pretrain on existing database workloads and apply the resulting model 142 to new database workloads.

The GEqO engine 110 provides a standalone framework that can be used alongside a query optimizer (not separately shown) to complement its ability to detect equivalent computation. Unlike adding new rewrite rules, which requires changing the core database engine code, the GEqO engine 110 learns any equivalence relationship in a workload, including those missed by the optimizer. In some examples, the GEqO engine 110 focuses on subexpressions that contain selections, projections, and joins ("SPJ subexpressions") with conjunctive predicates. Through detailed experiments, the computational efficiency and effectiveness of the GEqO engine 110 and its associated framework is demonstrated in detecting common computations.

In examples, the GEqO engine 110 assumes that an SQL query can be transformed into a tree (e.g., a logical plan) Q consisting of operator nodes (ops (Q), denoting the set of all operators in Q). Each subtree rooted at node i is a subexpression $q_i$ of Q. Let $S(Q) = \{q_1, \ldots, q_n\}$ be the set of all subexpressions induced by Q. Note that $Q \in S(Q)$; the root of the logical plan is itself a (trivial) subexpression of Q.

Further, the GEqO engine 110 also assumes that as a subtree in a logical query plan, subexpressions are unambiguously executable. Let $q_i(d)$ denote the result of executing subexpression $q_i$ on some database instance d. Let D be the set of all database instances. Given two subexpressions $q_i$ and $q_j$, they are semantically equivalent (denoted as $q_i \equiv q_j$) if and only if $\forall d \in D$, $q_i(d) = q_j(d)$. Note that $q_i$ and $q_j$ need not be drawn from the same query Q, and that this definition holds under both set and bag semantics.

An equivalence verifier applies an automated technique (e.g., a proof assistant or formal solver) to decide $q_i \equiv q_j$. Equivalence determined using an automated verifier (e.g., AV 160) is denoted herein as $q_i \stackrel{AV}{\equiv} q_j$. A verifier is correct but not complete (i.e., $(q_i \stackrel{AV}{\equiv} q_j) \Rightarrow (q_i \equiv q_j)$ but $(q_i \equiv q_j) \not\Rightarrow (q_i \stackrel{AV}{\equiv} q_j)$) and, in general, run in exponential time. Finally, given a pair of subexpressions, an equivalence filter applies a model, heuristic, or similar technique to approximately decide equivalence. With the GEqO engine 110, filter modules 120, 130, 140 trade off speed and precision to reduce the false positives that must be checked by an equivalence verifier (e.g., AV 160). Pairwise pseudo-equivalence is determined using a filter f is denoted as $q_i \stackrel{f}{\approx} q_j$.

Given the above, the core problem addressed by the GEqO engine 110 is formally defined as: Problem (Workload Equivalence)—Given a workload $W = \{q_1, \ldots, q_n\}$ of subexpressions, the GEqO engine 110 estimates $E(W) = \{(q_i, q_j) \in W \times W | q_i \equiv q_j\}$, (i.e., the equivalence set amongst all the pairwise combinations of subexpressions in W).

There are two important special cases of the workload equivalence problem. In the first case, the workload just has a pair of subexpressions $W = \{q_i, q_j\}$. The task reduces to just detecting pairwise equivalence ($q_i \equiv q_j$). This version of the problem is common for applications such as query rewriting or view matching. The second special case is when the input is a set of queries $\{Q^1, \ldots, Q^m\}$. Then the workload is the enumeration of all the subexpressions of the input queries, i.e., $W = \cup_k S(Q^k)$. This formulation is of importance to applications such as view recommendation, when the goal is to find common computation among a large set of queries. Although the GEqO engine 110 can handle pairwise equivalence detection very well, it is designed more as an efficient and scalable solution for supporting general workload equivalence when the workload set W is large (which includes the second special use case).

The overall architecture of the GEqO engine 110 is illustrated in FIG. 1. The GEqO engine 110 approximates computing an equivalence set by applying the series of filters $F=(f_1, \ldots, f_n)$ listed in Table 1 to a workload of subexpressions (e.g., initial workload 102). Filters (e.g., modules 120, 130, 140, 160) are applied in decreasing order of speed and increasing order of precision. Each filter is applied to every subexpression pair in the target workload W to approximate the equivalence set. To ensure correctness (e.g., for use in a view materialization algorithm), the GEqO engine 110 utilizes an automated verifier (e.g., AV 160) to eliminate false positives from the resulting equivalence set. It is important to note that if a pair is determined to be non-equivalent by a filter, it is not evaluated by subsequent filters and it is not verified (i.e., filters short-circuit).

The above process is formalized with the following two functions:

$$GEqO_{SET}(W, F) = \{(q_i, q_j) \in W \times W \mid GEqO_{PAIR}(q_i, q_j, F)\} \quad (1)$$

$$GEqO_{PAIR}(q_i, q_j, F) = \begin{cases} q_i \equiv q_j & \text{if } F = \emptyset \\ \bot & \text{if } q_i \stackrel{f_1}{\not\approx} q_j \\ GEqO_{PAIR}(q_i, q_j, F \backslash f_1) & \text{otherwise} \end{cases} \quad (2)$$

In examples, given a large workload of subexpressions, the GEqO engine 110 applies the filters in Table 1 (e.g., modules 120, 130, 140) to efficiently narrow down the candidate equivalent subexpression pairs, before calling the expensive AV 160. More specifically, the first filter applied is a schema filter (e.g., by the SF 120). Subexpressions that access different sets of tables or return different numbers of columns are highly unlikely to be equivalent. Therefore, the SF 120 groups all subexpressions in the workload based on the tables used and the number of columns returned, resulting in SF-groups. From this point forward, only subexpression pairs from the same SF-group are considered by subsequent filters. In the second step, for each SF-group, the VMF 130 embeds the subexpressions in a learned vector space and identifies likely equivalent pairs by employing approximate nearest neighbor search (ANNS). Example operations of the VMF 130 are described in greater detail below with respect to FIG. 2 and FIG. 3. The problem is formalized as follows: Definition (Vector Matching Filter (VMF))—Let e(q) be a function that embeds a subexpression q in a vector space v. Let d be a distance metric on v and $\tau$ be a threshold distance. Given subexpressions $q_1$ and $q_2$, let $q_1 \stackrel{VMF}{\approx} q_2$ when $d(e(v_1), e(v_2)) < \tau$.

To further improve efficiency, the GEqO engine 110 constructs a hierarchical navigable small world (HNSW) index, one approach to applying ANNS at scale. In the third step, the GEqO engine 110 applies the equivalence model filter (EMF) (e.g., EMF 140), which is a trained deep learning model (e.g., EMF model 142), to predict whether each candidate subexpression pair from the VMF filter are equivalent. Finally, the GEqO engine 110 utilizes the AV 160 (e.g., via SPES) to verify the correctness of the prediction from the EMF 140. Among the filters used in the GEqO engine 110, both VMF and EMF are machine learning based.

The EMF model 142 is a deep learning model comprising multiple tree convolutions and fully connected layers. On the other hand, the VMF 130 utilizes the learned tree convolution from EMF to embed subexpressions into its metric space.

More specifically, in examples, the EMF model 142 is a deep learning model trained to classify equivalence. Below describes an example training process and the semi-supervised feedback loop (SSFL) to iteratively improve the EMF model 142. To train the EMF model 142, the EMF 140 featurizes and labels a set of subexpression pairs as the training data (e.g., seed of labeled data 144). Labels are generated using the SPES automated verifier (e.g., AV 160). During featurization, in addition to converting subexpressions to a fixed-length vector representation, the EMF 140 applies a database-agnostic (db-agnostic) transformation. This transformation replaces references to specific tables and column names with symbolic correspondences between subexpression pairs, generalizing the EMF learning from specific examples of (non) equivalent subexpressions to patterns of (non) equivalent subexpressions. This also ensures that the EMF model 142 learned on a particular workload and database is transferable to other workloads and databases, allowing for user-supplied or synthetically generated initial training workloads.

The GEqO engine 110 employs the SSFL as a guardrail against regressions. The GEqO engine 110 monitors the confidence levels of predictions made by the EMF model 142, and if confidence falls below a threshold (e.g., due to new or evolving workloads), the GEqO engine 110 iteratively fine-tunes the EMF model 142 through the SSFL pipeline (e.g., via labeled pairs 162). The key challenge in the SSFL pipeline is generating high-quality samples with balanced positive and negative examples for model fine-tuning in each iteration. Even a modest workload produces an intractably large training dataset that is quadratic in the number of subexpression pairs (e.g., 1000 queries with 10 subexpressions each produces a training dataset of almost 100 million pairs). This dataset is also highly imbalanced, since most subexpression pairs are unlikely to be equivalent.

To address this challenge, the GEqO engine 110 employs the cheap SF and VMF filters (e.g., modules 120, 130) to efficiently identify pseudo-equivalent subexpression pairs (e.g., computes $q_1 \stackrel{SF}{\approx} q_2 \wedge q_1 \stackrel{VMF}{\approx} q_2$ over a workload sample, shown in FIG. 1 as pseudo-equivalent samples 132). This computation approximates Equation (2) without the verification step. Together with another set of randomly generated, likely non-equivalent pairs (e.g., shown in FIG. 1 as negative-samples 106), they form an approximately balanced new sample. As before, the GEqO engine 110 labels and applies the db-agnostic transformation to the new sample 106, 132. The GEqO engine 110 then augments its training dataset (e.g., seed of labeled data 144) with the new data (e.g., labeled pairs 162) and fine-tunes the EMF model 142. As previously noted, the GEqO engine 110 identifies general semantic equivalence, agnostic to the underlying database. The EMF model 142 therefore does not consider database constraints or other instance-specific metadata.

In the example of Table 1, each filter provided by the GEqO engine 110 has an associated complexity for applying that filter on a workload W containing n subexpressions. For example, considering the SF provided by the SF 120, and assuming a constant-sized schema, the SF 120 groups n subexpressions by the used tables and the number of returned columns in $\mathcal{O}(n)$ time. Considering the VMF filter provided by the VMF 130, given that the HNSW index used by the VMF has claimed search complexity logarithmic in the number of indexed objects, the VMF 130 indexes the workload subexpressions in $\mathcal{O}(n)$ time (e.g., assuming a constant embedding size). Next, for each vector, the VMF 130 performs a $\mathcal{O}(\log n)$ radius search for neighbors within Euclidean distance τ, with total complexity in $\mathcal{O}(n \log n)$. Considering the EMF filter provided by the EMF 140, the EMF model 142 contains two convolution layers followed by three fully connected layers (described in further detail below). The input is a pair of subexpressions, each with ops ($q_i$) nodes. It is assumed that there are many more subexpressions in the workload than operators in the largest tree (i.e., $\max\{ops(q_i)|q \in W\} \ll n$. Total complexity is thus dominated by the matrix multiplication in the fully connected layers (i.e., $\mathcal{O}(n^3)$). Considering the automated verifier provided by the AV 160, and to ensure correctness, the AV 160 verifies pairs produced by the other filters of modules 120, 130, and 140. The AV 160 leverages SPES, which uses the Z3 SMT prover to check equivalence. In other examples, the GEqO engine 110 can leverage any verifier as in place of the example AV 160. An SMT program can be transformed into an equivalent SAT formulation containing γ symbols, which is solvable in $\mathcal{O}(2^{\Omega(\gamma)})$ time.

Figure 2:
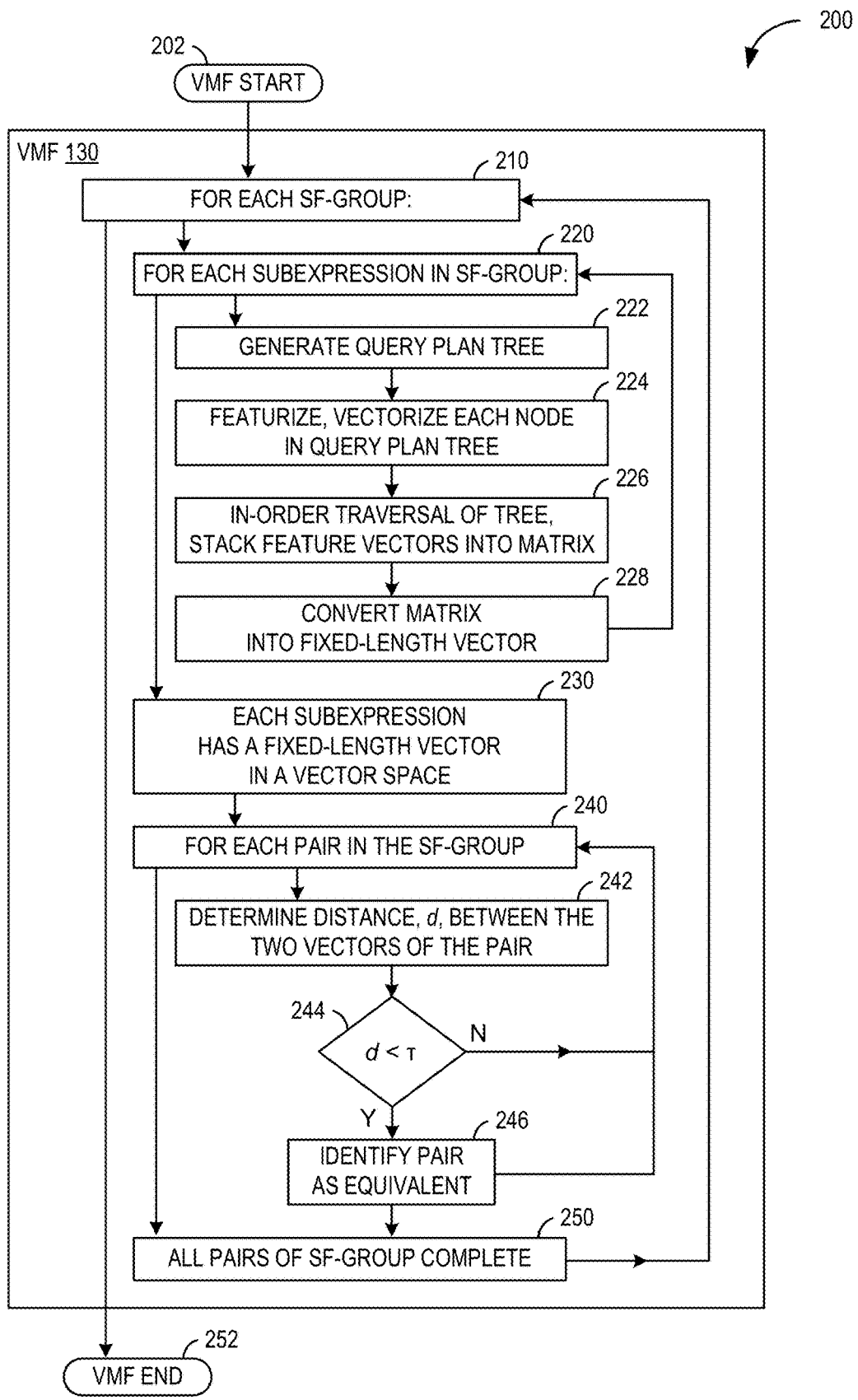
FIG. 2 is a flowchart of example operations performed by a vector matching filter (VMF) to perform vector matching filtration.

FIG. 2 is a flowchart 200 of example operations performed by the VMF 130 to perform vector matching filtration. In examples, at this stage of processing, the SF 120 has grouped the subexpressions of the workload 102 into SF-groups, as discussed above (e.g., based on tables referenced, number of columns returned). The VMF 130 begins vector matching filtration at operation 202. At operation 210, the VMF 130 processes a particular SF-group, looping as shown in FIG. 2 until all SF-groups have been processed. Within each SF-group, the VMF 130 processes each particular subexpression in that SF-group in a loop at operation 220 (e.g., including operations 222-228 for each subexpression). This subexpression processing loop includes initially generating a query tree plan for each subexpression at operation 222. As discussed above, this query tree plan includes a node for each operator, where its children node(s) are sub-operators nested or otherwise included with that operator. In examples, the Calcite parser is utilized to extract a set of tables within the query tree plan associated with the subexpression. The SF module 120 caches the sets of tables associated with each subexpression. If a subexpression has been previously encountered, the VMF 130 recovers the set of tables from the cache (e.g., to avoid the need for parsing the same subexpression multiple times). At operation 224, the VMF 130 featurizes each node in the query tree plan of this current subexpression, thus generating a feature vector for each node. In examples, the vectorization/featurization of operation 224 is a one-hot encoding. In some examples, operation 224 also includes performing a DB-agnostic encoding (described in greater detail below with regard to FIG. 3).

At operation 226, the VMF 130 performs an in-order traversal of the query tree plan, adding each feature vector of each node to a matrix for the subexpression (e.g., having a number of rows equal to the number of nodes in the query tree plan). At operation 228, this matrix is converted to a fixed-length vector through a set of tree convolutions (also described in greater detail below with regard to FIG. 3).

At this stage, the current subexpression has been converted into a fixed-length vector. Each such subexpression in the SF-group is converted as such via operations 220-228. As such, by stage 230, each subexpression of the SF-group has a fixed-length vector in some vector space. Next, the VMF 130 evaluates each pair of subexpressions within the SF-group at operation 240. In some examples, within each SF-group, some pairs may already be identified (e.g., by the SF 120) as equivalent or not equivalent. Such pairs may be skipped or otherwise ignored by the VMF 130 at stage 230.

For any given pair of feature subexpressions that are not already identified as equivalent (e.g., by the SF 120), the VMF 130 determines a distance, d, between the two associated vectors at operation 242 (e.g., Euclidean distance, Manhattan distance, or the like). At test 244, if the distance, d, between the two vectors is less than a distance threshold, τ, the two subexpressions are identified as equivalent at operation 246. In some examples, the distance threshold, τ, is a configurable parameter that may be adjusted (e.g., manually by an administrator, automatically based on historical performance of the VMF 130). As τ is increased, the VMF 130 admits more pairs that are not actually equivalent, where as τ is decreased, the VMF 130 admits fewer pairs but they are more likely to be equivalent (e.g., affecting the TNR).

As such, in the example, each pair of subexpressions in the SF-group are examined for equivalence based on their associated vectors (e.g., via operations 240-246). This example asks, given a particular vector in a vector space for the SF-group, what other vectors are within a particular distance or radius of that vector. In terms of complexity, this example operates at $\mathcal{O}(n^2)$, overall. In order to reduce the cost of this search, in some examples, the VMF 130 performs an approximate nearest neighbor search (ANNS) method to find the nearest vectors to any given vector. In examples, the VMF 130 performs ANNS by constructing a hierarchical navigable small world (HNSW) index on the vectors. The HNSW index is a high-performance technique with moderate precision. This reduces the complexity of this search to log n, and thus the overall complexity to $\mathcal{O}(n \log n)$ for this VMF stage of filtration. In such examples, the VMF 130 performs an ANNS optimization step (e.g., after operation 230) that inserts the fixed length vector into the HNSW index, then, for each fixed-length vector, v, performs a radius search of a distance, τ, then admits pairs comprised of v and each fixed-length vector found in the search. In some examples, Facebook AI Similarity Search (FAISS) is used.

When all pairs of a particular SF-group are complete at stage 250, the VMF 130 returns to analyze the next SF-group at operation 210. When each SF-group has been processed by the VMF 130, the VMF filtration process ends at stage 252.

Figure 3A:
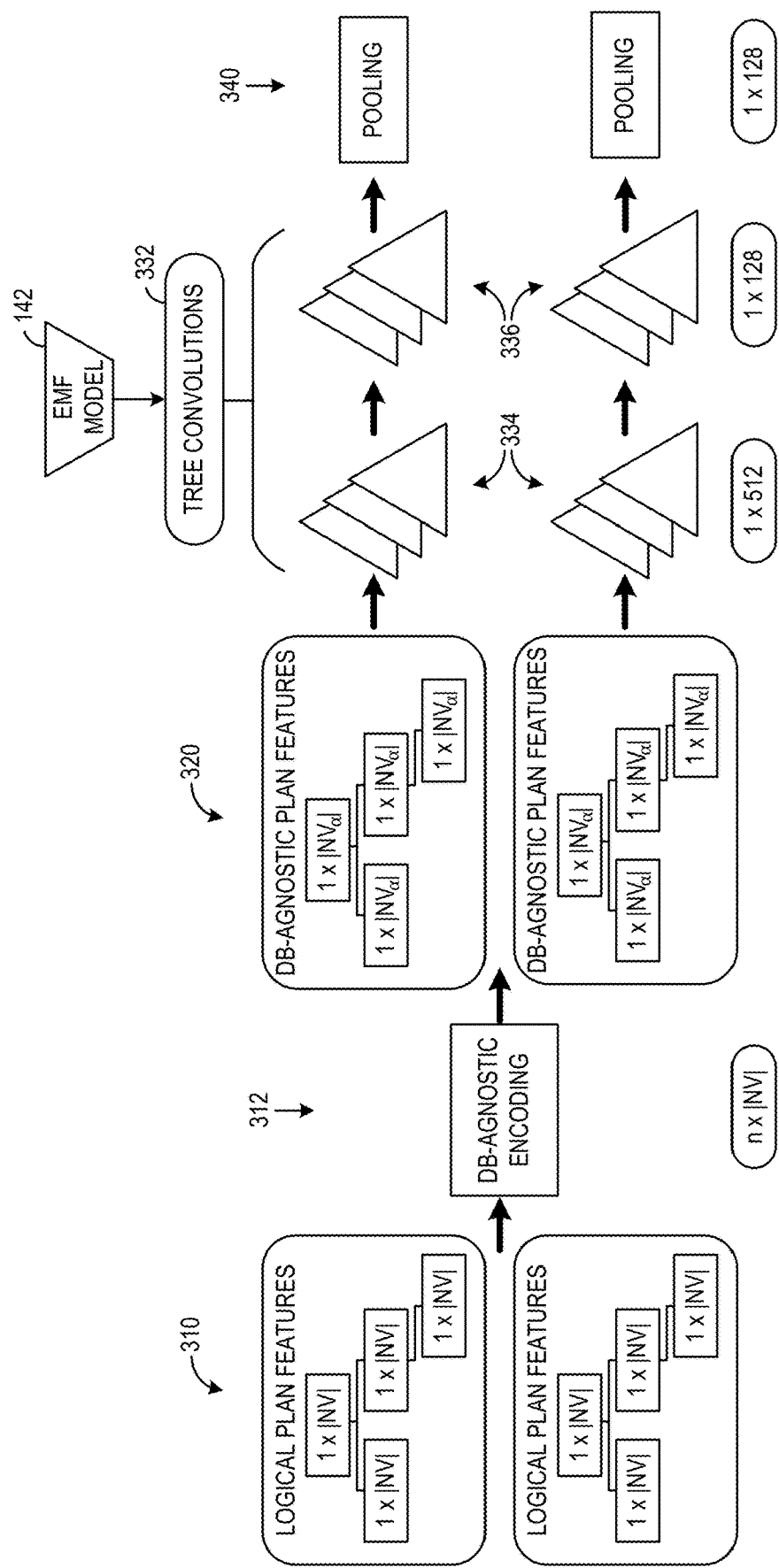
FIG. 3A and FIG. 3B illustrates additional aspects of the VMF filtration process shown in FIG. 2 as well as steps of the equivalence model filter (EMF) filtration.
Figure 3B:
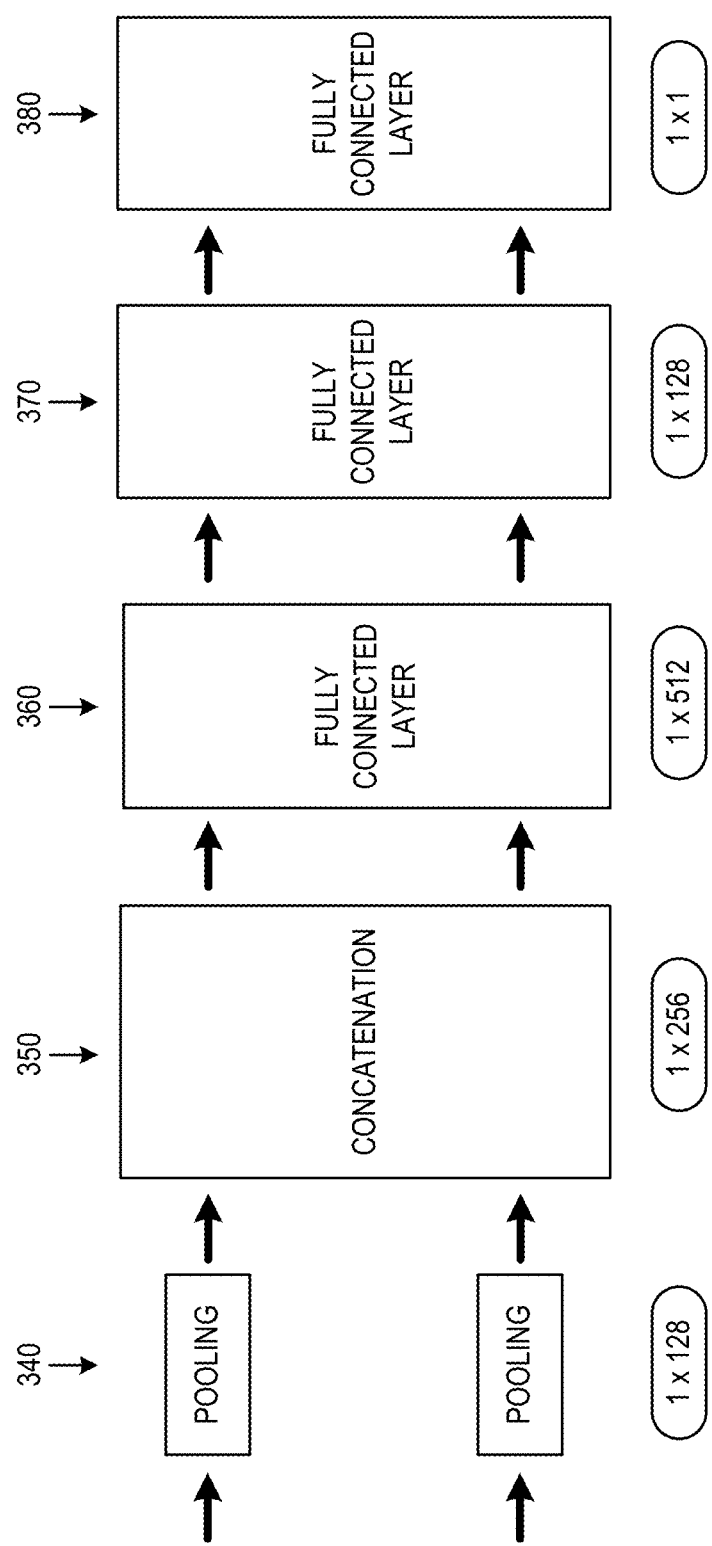

FIG. 3A and FIG. 3B illustrates additional aspects of the VMF filtration process shown in FIG. 2 as well as steps of the EMF filtration. In the example, two logical plans 310 are shown for two particular subexpressions. Featurizing the tree structure of a logical plan 310 is challenging since it is difficult to express an arbitrarily-shaped, variable-size tree as a fixed-size feature vector without losing the structure of the tree. To address this, the VMF 130 applies a tree-vector transformation that converts an arbitrary logical plan 310 into a fixed-length vector (e.g., pooling vector 340). In examples, the VMF 130 first encodes each node in the logical plan 310 as a node vector (NV). Each NV has the same size and format (described in further detail below), but the number of NVs (i.e., number of nodes in the logical plan 310) can vary widely. In the example, the VMF 130 also applies DB-agnostic encoding 312 to convert the plans 310 to DB-agnostic plans 320. Given a tree of NVs, the VMF 130 next performs a breath-first traversal of the tree for each plan 320 and concatenates each visited NV into a m×l matrix, M, where m is the number of nodes in a logical plan 320 and l is the size of each NV (e.g., as in operation 226 of FIG. 2). The VMF 130 finally applies tree convolution layers 332 (also described in further detail below), which transforms the matrix M into a vector of a fixed dimension h that summarizes a subexpression. In one example prototype, the fixed vector dimension is h=128 bytes (e.g., where the resulting pooling vector 340 for each subexpression is 1×128). Tree convolution is effective at representing tree-structured SQL query plans for various ML-for-DB tasks. In examples, the pooling vector 340 is reused as the fixed-length vector generated during operation 228 of FIG. 2 (from the VMF module 130). In examples, pooling is performed at pooling 340.

The VMF 130 encodes each node in the logical plans 310, 320 as node vectors (NV). In the example, instance-based encoding is used (e.g., where the encoding is specific to a workload on a particular database instance) to generate the logical plans 310. This approach is then extended with the db-agnostic encoding 312, which is oblivious to the specific workload or database, to generate the db-agnostic plans 320.

More specifically, given a workload W on a database instance, let $T_W$, $C_W$, $O_W$, and $J_W$ respectively represent the set of tables, columns, arithmetic operators (e.g., ≤, =, ≥, ≠), and join types (e.g., inner join '⋈', left outer join '⋉', right outer join '⋊', full outer join '⟗') referenced in the workload. Let onehot(e, U) produce a one-hot encoded vector of size |U| with entry e∈U set to one, null(x) indicate whether x is null, and norm(x) normalize x over all scalars in a workload.

Figure 4:
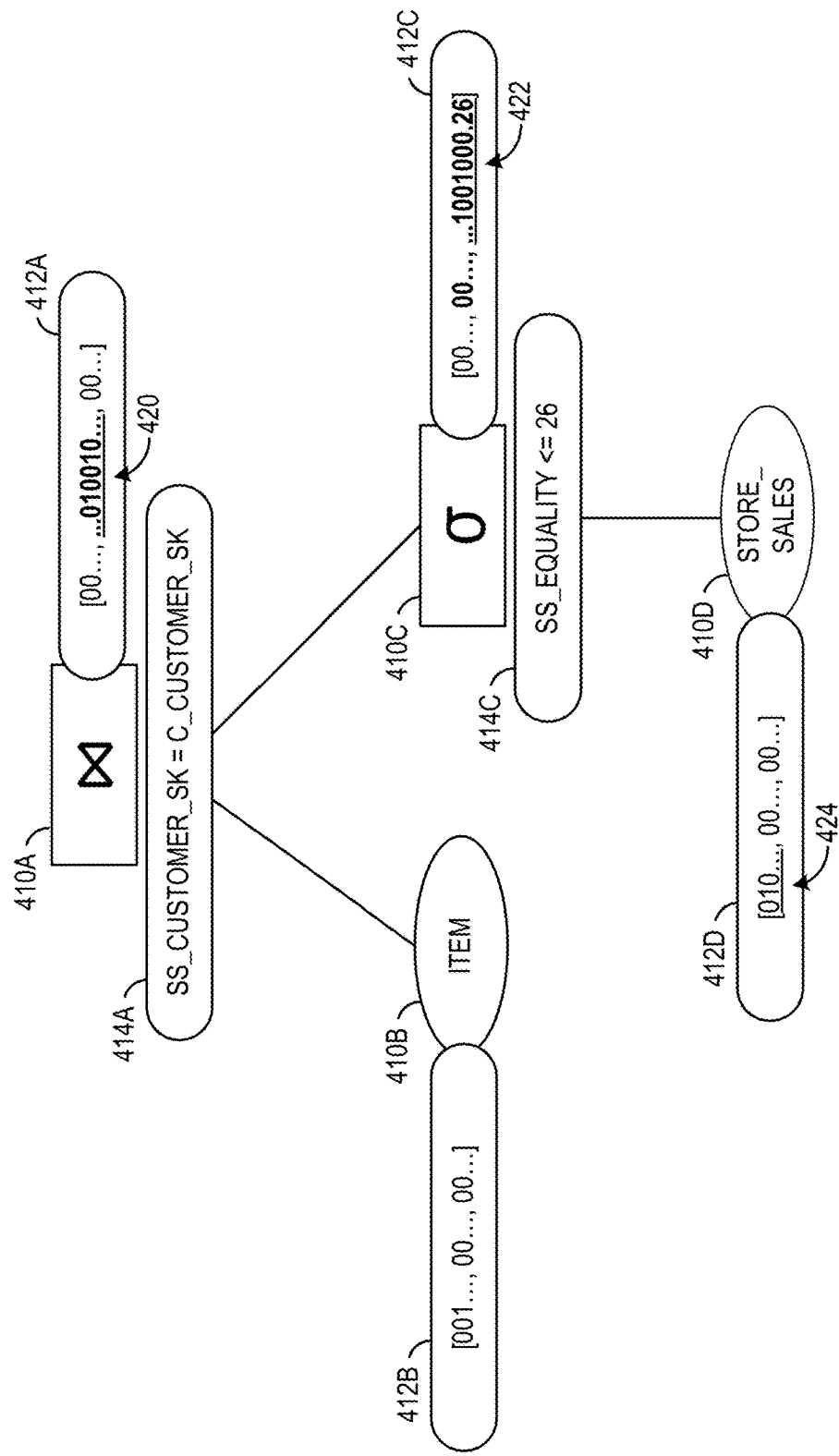
FIG. 4 s a graph showing the instance-based encoding process performed by the VMF.

FIG. 4 is a graph 400 showing the instance-based encoding process performed by the VMF 130. In some examples, the graph 400 is similar to the logical plan 310 or db-agnostic plan 320 of FIG. 3A. The example graph 400 includes nodes 410A-410D, each of which includes a node vector (NV) 412A-412D, respectively. Node 410A represents a join operator, '⋈', also denoted herein as $V_{join}$. Node 410B represents an item. Note 410C represents a selection segment, 'σ', also denoted herein as $V_{select}$. Node 410D represents a table, 'STORE_SALES', also denoted herein as $V_{table}$.

In the example, for a scan operator (e.g., table segment 424) on a table t, the VMF 130 generates the segment $V_{table}$=onehot (t, $T_W$). For a selection operator with a predicate (e.g., predicate segment 422, also shown as SQL syntax 414C) referencing a column c, an arithmetic operator o, and up to one constant value v (constant folding is performed prior to encoding), the VMF 130 generates the segment $V_{select}$=onehot (c, $C_W$) ⊕onehot (o, $O_W$) ⊕norm (v) ⊕null (v), where ⊕ is the concatenation operation. Finally, a join operator has a join predicate (e.g., join segment 420, also shown in SQL syntax 414A) referencing a left-side column $c_l$, an arithmetic operator o, right-side column $c_r$, and a join type j. As such, the VMF 130 generates the join segment $V_{join}$=onehot ($c_l$, $C_W$) ⊕onehot (o, $O_W$) ⊕onehot ($c_r$, $C_W$) ⊕onehot (j, $J_W$).

In the example, the VMF 130 concatenates the table, join, and selection segments 424, 420, 422 to form a final vector for this subexpression, namely, NV=$V_{table}$ ⊕$V_{join}$⊕$V_{select}$. For a segment that does not apply to a tree node, the VMF 130 sets it to be zero (e.g., the join segment for a non-join operator is all zeros). Note that |NV|=|$T_W$|+3·|$C_W$|+2·|$O_W$|+ |$J_W$|+2 (in one example provided herein, |NV|=210).

Instance-based encoding makes sense for solving problems such as cardinality estimation and query optimization, where the solution targets a specific workload on a particular database instance. In contrast, the problem of learning equivalent subexpressions can be reformulated to be database agnostic. Recall the two example queries, Query 1 and Query 2, as well as their associated subexpressions (e.g., the two inner SELECT statements described above in relation to FIG. 1). If those table and column names were to be changed to those shown here:

Query 3 Inner SELECT:
  SELECT t1.c1, t2.c2 FROM t1, t2
  WHERE t1.c1=t2.c1
  AND t1.c2>t2.c2+10
  AND t2.c2>10
Query 4 Inner SELECT:
  SELECT t1.c3, t2.c3 FROM t2, t1
  WHERE t2.c1=t1.c1
  AND t2.c2+10<t1.c2
  AND t2.c2+10>20
  AND t1.c2>20

As such, the two new subexpressions (of Query 3 and Query 4 Inner SELECTs, above) remain equivalent to the original inner SELECTS of Query 1 and Query 2, even though they are now for a completely different database, workload, or dataset.

This observation is the basis for the db-agnostic node vector encoding technique performed by the VMF 130. Conceptually, for each labeled training data point, the VMF 130 generalizes the pair of subexpressions into subexpression patterns, and feeds these generalized patterns into a model. As a result, the GEqO 110 is able to transfer the learning from one workload for a database instance to a different workload on a different database.

For equivalence detection, what really matters is the tables and columns referenced in the pair of subexpressions. Further, in terms of columns, only the columns referenced by the join conditions, selection predicates, and projections (instead of all columns from the referenced tables) are considered in this example. Moreover, the actual names of the tables and columns are unimportant. As a result, the VMF 130 converts the tables and columns in a pair of subexpressions into a generic symbolic form to derive their underlying patterns.

In examples, the VMF 130 does this (e.g., in the db-agnostic encoding 312) by transforming referenced tables into a set of distinct, generic table symbols $\{t_1, \ldots, t_n\}$ based on an arbitrary lexicographical order (e.g., sorted alphanumerically in the example implementation). The VMF 130 similarly symbolizes the referenced columns as $c_1, \ldots, c_n$. The below Table 2 is provided for converting the example Inner SELECTs of the example Query 1 and Query 2 into the example Query 3 and Query 4 Inner SELECTs provided above:

TABLE 2

| Symbols generated for Query 1 & 2 to Query 3 & 4 | |
| --- | --- |
| Reference | Symbol |
| A | t1 |
| A.joinKey | t1.c1 |
| A.val | t1.c2 |
| A.x | t1.c3 |
| B | t2 |
| B.joinKey | t2.c1 |
| B.val | t2.2 |
| B.y | t2.c3 |

With db-agnostic encoding, the VMF 130 sets $T'_W=\{t_1, \ldots, t_n\}$, where n is the maximum number of symbolized table correspondences expected in any workload, and $C'_W=\{t1.c1, \ldots, t1.cm, \ldots, tn.c1, \ldots, tn.cm\}$, where m is the maximum number of symbolized column correspondences per table expected in any workload. As such, the VMF 130 sets n and m to be large enough numbers to cover arbitrarily complex subexpressions. However, n and n×m are typically much smaller than the total number of tables and columns in the workload, respectively.

Following this transformation, $T'_W$ and $C'_W$ as the new "workload tables" and "workload columns" to replace $T_W$ and $C_W$ described above. Then to encode, for each pair of subexpressions, the VMF 130 first symbolize each subexpression into symbolic pattern and apply the previously-introduced instance-based encoding to produce a final db-agnostic encoding $NV_\alpha$ of size $|NV_\alpha|=|T'_W|+3\cdot|C'_W|+2\cdot|O_W|+|J_W|+2$. This encoding is represented in FIG. 3A as db-agnostic plan 320.

The example db-agnostic encoding described above is for a pair of subexpressions. The encoding of one subexpression is different depending upon which other subexpression it is paired with during featurization. Given a large workload of n subexpressions, the encoding for each pair is recomputed (an $\mathcal{O}(n^2)$ computation). In contrast, in the instance-based encoding, the encoding of one subexpression stays unchanged no matter what other subexpression it is paired with. In other words, the VMF 130 only needs to compute the encoding for each subexpression once (an $\mathcal{O}(n)$ computation). For offline training, the performance of db-agnostic encoding is not so as significant, but for online inference, any improvement in the encoding process is valuable. To speed up the db-agnostic encoding process, in some examples, the VMF 130 uses an efficient method to quickly convert an instance-based encoding to a db-agnostic encoding. With this approach, the VMF 130 only incurs $\mathcal{O}(n)$ computation to produce the instance-based encoding, then applies a lightweight converter (not separately shown) for each pair of subexpressions.

In examples, the converter takes as input the instance-based tree matrices for both subexpressions. For each subexpression, it first projects out the submatrix $S_T=M[T]$ that corresponds to the table segment, and the submatrices $S_{C_s}=M[C_s]$, $S_{C_l}=M[C_l]$, and $S_{C_r}=M[C_r]$ that correspond to the column encoding from the selection segment, the left-side column encoding, and the right-side column encoding from the join segment. The VMF 130 first unions the column submatrices by applying bit-wise or to compute the column submatrix $S_C=S_{C_s} \vee S_{C_l} \vee S_{C_r}$. For the table submatrix $S_T$, the VMF 130 computes a vector r that represents the column-wise union of the tables referenced in each subexpression, with $r_j=\vee_i S_T[i, j]$. Next, the VMF 130 generates a mask $m_T$ by unioning the vectors from both subexpressions (e.g., representing all tables referenced in either of subexpressions). The VMF 130 then applies this mask on $S_T$ from both subexpressions to eliminate matrix columns corresponding to unreferenced tables. The resulting submatrix is $S'_T$. The VMF 130 applies the same process on the column matrices to compute the mask $m_C$, and use $m_C$ to eliminate matrix columns corresponding to unreferenced table columns from $S_{C_s}$, $S_{C_l}$, and $S_{C_r}$ for each subexpression, resulting in $S'_{C_s}$, $S'_{C_l}$, and $S'_{C_r}$. Finally, for each subexpression in the pair, the VMF 130 replaces the submatrices $S_T$, $S_{C_s}$, $S_{C_l}$, and $S_{C_r}$ with their transformed variants. The result is a pair of db-agnostic tree matrices $M_\alpha$ which eliminates references not found in either subexpression. In examples, it is noted that applying the converter described above is 1.8 times faster than computing pairwise db-agnostic encodings from scratch.

In examples, the VMF 130 uses two tensor-based extensions to the above encoding technique. In a first approach, referred to herein as batch pairwise encoding, db-agnostic encoding is extended to support batch encoding n pairs. To do so, rather than performing n discrete operations on pairs of two-dimensional submatrices of size $|q_i|\times|X|$, where $|q_i|$ represents the number of tree nodes in a subexpression's logical plan and X is a table or column segments of the NV, the VMF 130 represents the batch as a pair of three-dimensional tensors of size $\max(|q_i|)\times|X|\times n$. Subexpressions with fewer than $\max(q_i)$ operators are zero-padded, which does not affect correctness. The resulting tensor is amenable to being operated on using tensor-oriented frameworks such as PyTorch.

In a second approach, referred to herein as generalizing from pairs to n-subexpressions, the db-agnostic transformation described above is a binary operation over two subexpressions. A second generalization involves extending it to be an n-ary operation over many subexpressions. This extension only impacts the computation of the mask (e.g., rather than $r_1 \vee r_2$, instead the following is computed: $r_1 \vee \ldots \vee r_n$ (other operations are unchanged). This extension is also amenable to tensor execution.

In fact, this n-ary, tensor-based encoding is used in the VMF 130 in some examples. Recall that after applying the SF filter, the SF 120 groups input workload into SF-groups based on tables accessed and the number of columns returned. In the VMF filter, the VMF 130 then applies the n-ary db-agnostic transformation to all subexpressions in each SF-group. The VMF 130 then convolves the encoded node vectors to produce a fixed-size vector for each subexpression. The VMF 130 finally conducts an approximate nearest-neighbor search (ANNS) on the resulting vectors to identify candidate subexpression pairs that are likely to be equivalent. Note that all subexpressions in an SF-group access the same set of tables. Therefore, the group-based db-agnostic encodings for subexpressions from the same SF-group approximate their pairwise db-agnostic counterparts.

Referring again to FIG. 1, regarding feature engineering and feature selection used by the EMF 140, after conducting extensive feature analysis, it is determined that logical plans 310, 320 play a significant role in predicting equivalence, since the logical plan captures the semantics of a subexpression. As a result, in the EMF 140, the logical plans 310, 320 of the subexpression pairs are used as inputs to the EMF model 142. In some examples, the EMF 140 also leverages cardinalities as an auxiliary feature. Intuitively, since $q_i=q_j \Rightarrow |q_i|=|q_j|$, this would appear to be a strongly positive signal for equivalence. However, while initial analysis indicates that cardinalities do improve EMF recall, actual subexpression cardinalities are not generally available for use as inputs to the GEqO engine 110 and executing candidate subexpressions to determine cardinality can be costly at scale. Conversely, estimated cardinalities are quick to compute but yield only marginal benefit to the prediction task. Thus, in examples, the EMF 140 relies on logical plans as input features to the EMF model 142.

The EMF 140 canonicalizes the conjunctive predicates in selection and join operators by splitting each n-clause predicate into a composite containing n single-clause predicates. For example, the EMF 140 transforms a relational selection operator $\sigma_{x>25 \wedge y<10,000}(R)$, into the composite $\sigma_{x>25}(\sigma_{y<10,000}(R))$. As a result, each node in the logical plan has at most one selection or join predicate.

Recall from above that the EMF model 142 is a schema-independent deep learning model trained to classify equivalence between a pair of subexpressions. In building the EMF model 142, several candidate architectures are possible, including various supervised classifiers, logistic regression (LR), random forests (RF), and multi-layer perceptrons (MLP). While the LR and RF models are simple to train and exhibit moderate performance, they suffered from one fundamental limitation: they do not allow incremental training and fine-tuning. As discussed below, the ability to incrementally fine-tune a model is important for adapting to changing workloads and maximizing transferability. On the other hand, MLPs are more expensive to train but support incremental training, and thus need to be fed newly-labeled samples to fine-tune the previous model.

Referring again to FIG. 3A and FIG. 3B, the EMF 140 utilizes the MLP model 142 for classification in the EMF model 142. The overall architecture of the EMF model 142 is illustrated in FIG. 3A and FIG. 3B. It comprises two tree convolution layers 334, 336 (shown in FIG. 3A) and three fully connected layers 360, 370, 380 (shown in FIG. 3B). As inputs, the EMF model 142 accepts a pair of instance-encoded logical plans 310, where each node is an instance-encoded vector of size |NV| (e.g., as described above). These plans 310 are then transformed into their db-agnostic counterparts (e.g., plans 320, with vectors of size $|NV_\alpha|$) by applying the encoding transformation described above. Next, the EMF 140 applies two tree convolutions 334, 336 to the db-agnostic plans 320. Each convolution 334, 336 is followed by batch normalization and parametric rectified linear unit (PReLU) activation. The two resulting 128-byte summaries of each subexpression logical plan (represented here as pooling 340) are then concatenated (e.g., at concatenation 350) and passed through three fully connected layers 360, 370, 380 for classification.

In examples, during training of the EMF model 142, the EMF 140 uses a large set of labeled training data (e.g., subexpression pairs, the seed of labeled data 144 shown in FIG. 1). Because this db-agnostic encoding technique enables transferability between workloads and database instances, the EMF 140 initially trains the EMF model 142 on a high-quality synthetic workload that contains a wide range of positively- and negatively-labeled subexpression pairs. In examples, the EMF 140 leverage two query generation tools: AMOEBA and WeTune to generate such data.

The use of AMOEBA by the EMF 140 employs a domain-specific fuzzing technique to generate a set of base queries $B_Q$. The EMF 140 then applies a set of semantic-preserving query rewrite rules R on a given query $q_i \in B_Q$ and generates a set of queries $Q'_i = \{q'^1_i, \ldots, q'^n_i\}$ equivalent to $q_i$. The EMF 140 leverages AMOEBA by applying it to produce a dataset of positively-labeled pairs $W_+ = U_i \{(q_\alpha, q_\beta) | q_\alpha \in Q'_i \cup \{q_i\} \wedge q_\beta \in Q'_i \cup \{q_i\} \wedge q_\alpha\}$.

To ensure a wide variety of training examples, the EMF 140 further leverages WeTune, which is an optimizer rule generator that automatically generates a set of non-reducible and interesting rewrite rules (including rules missed by prominent commercial query optimizers). The EMF 140 applies WeTune-generated rules to rewrite the set $B_Q$ of base queries produced by AMOEBA. The EMF 140 then repeats the process described above to produce a WeTune-augmented training data set $W'_+$.

The above process yields a diverse set of equivalent subexpression pairs. To generate a corresponding set of non-equivalent pairs, the EMF 140 groups all subexpressions in $B_Q$ into schema-compatible groups ($\{B_Q^1, \ldots, B_Q^n\}$) by applying the SF. Each group contains subexpressions that reference the same base tables and return the same number of columns (e.g., they are non-degenerate and would not be subsequently filtered by the SF). Next, the EMF 140 generates a set of negative examples 106 by randomly pairing the subexpressions in each group: $W_- = \{(q_\alpha, q_\beta) | q_\alpha, q_\beta \in B_Q^i \wedge (q_\alpha, q_\beta) \notin W_+\}$. While this process might (with low probability) yield a false negative (e.g., by negatively labeling a pair that is actually equivalent), model training is resilient to small amounts of noise in training data. Nonetheless, a perfect dataset could be produced by applying the automated verifier (AV) to confirm the label of each negative pair.

Using the above, the EMF 140 finally draws a balanced set of labeled examples from $W_+$ and $W_-$ to produce a synthetic training dataset that contains a variety of syntactically dissimilar and semantically equivalent logical plans. This, along with well-known machine learning techniques such as tree convolution and dynamic pooling that provide resiliency to minor perturbations, enables the EMF 140 to generalize to plans of varying shapes and sizes.

To maximize EMF performance, the EMF 140 also performs a search over model structure and hyperparameters. This search considers various network architectures (e.g., between 1-5 linear and convolution layers and sizes 32-1412), activation functions, dropout, and optimizer parameters such as learning rate and decay. The synthetic dataset is evaluated on, based on TPC-H as described herein. It is noted that increasing the number of convolution and hidden layers beyond two did not improve accuracy. Layer sizes have a modest impact on accuracy. Optimizer choice and learning rate had a negligible impact on performance.

Regarding the semi-supervised feedback look (SSFL), and referring again to FIG. 1, when applied to a new workload or as the distribution of (non) equivalent subexpressions in a workload drifts over time, the performance of the previously-trained EMF model 142 may suffer.

To mitigate this, the GEqO engine 110 employs a semi-supervised learning bootstrapping feedback loop (SSFL). The SSFL continuously monitors performance of the EMF model 142 and retrains with newly generated training data when needed. To accomplish this, the GEqO engine 110 continuously measures the confidence level of classifications made by the EMF model 142. If a confidence level falls below a threshold $T_h$, the SSFL dynamically samples a new, balanced set of labeled samples from the current workload. It uses this sample to fine-tune the EMF model 142. The SSFL iterates this process until performance of the EMF model 142 reaches a desirable confidence level.

The SSFL confidence level is formalized as follows: Definition (SSFL Confidence Level). Let W be a set of queries to compute $GEqO_{SET}(W, F)$ over (q.v. Equation (1)). Let $P_1^p$ be the probability estimate that the pair p ∈ W×W exhibits an equivalence relationship, and $P_0^p$ be the probability that p exhibits a non-equivalence relationship. The SSFL confidence Level, SSFL-CL of W, is computed as follows:

$$SSFL - CL(W, P_0, P_1) = \frac{\sum_{p \in W \times W} [\max(P_0^p, P_1^p) \geq T_h]}{|W \times W|}.$$

Ideally, it is desirable for the semi-supervised learning feedback to only trigger a few rounds of finetuning before it reaches a satisfactory confidence level. To achieve this, it is important to choose good samples with good positive and negative examples in each iteration for retraining or finetuning the EMF model 142. A naive sampling approach is to random sample pairs of subexpressions from the workload. However, this simple approach is like shooting in the dark and is unlikely to provide sufficient positive examples for the model 142 to learn, since positive examples (equivalent subexpressions) are generally rare events compared to negative examples in a typical workload.

It is thus important to make sure to locate some good positive examples for training. As described above, by leveraging SF and VMF, the GEqO engine 110 can quickly identify a set of likely equivalent subexpression pairs (e.g., pseudo-equivalent sample 132) from a large search space, then label the pairs by actually running the equivalence verifier (e.g., AV 160). In the example, this step keeps all the positive and negative examples. Moreover, if more negative examples are needed for a balanced sample, random sample pairs of subexpressions can be acquired from the workload (e.g., negative-sample 106). This filter-balanced sampling mechanism can significantly improve the quality and performance of the model 142 with fewer labeled sample data compared to random sampling.

In examples, the SSFL algorithm is formalized as such:

Algorithm 1: The semi-supervised feedback loop (SSFL).

Input: A workload $W$.

Output: An EMF model, fine-tuned if confidence is low.

function $SSFL(W)$:

$P_0 \leftarrow \emptyset$ $P_1 \leftarrow \emptyset$ foreach $(q_i, q_j) \in W \times W$ do $\rho \leftarrow \text{Sigmoid}(EMF(q_i, q_j))$ $P_1 \leftarrow P_1 \cup \{\rho\}$ $P_0 \leftarrow P_0 \cup \{1 - \rho\}$ if $SSFL\text{-}CL(W, P_0, P_1) \leq T_h$ then $S_+ \leftarrow AV(VmF(SF(W \times W)))$ $S_- \leftarrow \text{sample}((W \times W) \backslash S_+, |S_+|)$ $EMF \leftarrow \text{train}(EMF, S_+ \cup S_-)$ return $EMF$ The above example Algorithm 1, as performed by the GEqO engine 110, accepts a workload W and examines each pair in the cross product. For each pair, the GEqO engine 110 applies the Sigmoid function to the EMF output to compute the probability p that the pair ($q_i$, $q_j$) exhibits an equivalence relationship. Note that probability estimates are trivial to compute when applying the EMF during prediction. Next, the GEqO engine 110 computes a confidence level (e.g., SSFL-CL) and, if the model is insufficiently confident, generates a sample of likely-equivalent pairs by applying the SF and VMF. The GEqO engine 110 then produces a complimentary sample of size $|S_+|$ sampled randomly from non-equivalent pairs to form $S_-$, and finally retrains or fine-tunes the EMF using the full sample.

Experimental Results

In examples, an experimental evaluation of the GEqO engine 110 is provided. The goals of the evaluation are as follows: to (i) compare various EMF models to determine their effectiveness in predicting equivalence relationships, as well as assessing their ability to transfer learning across different workloads and databases; (ii) study the performance of the VMF filter in terms of its ability to filter out "easy" equivalence cases; (iii) evaluate the SSFL pipeline with the filter-based sampling mechanism; (iv) examine runtimes of VMF and EMF filters on CPU- and GPU-based implementations; and (v) evaluate the impact of the GEqO engine 110 on scaling state-of-the-art equivalence solvers for a large workload.

In examples, the GEqO engine 110 is implemented using Python 3.10.0 and Java 18.0.2. The GEqO engine 110 manipulates subexpressions, parse and generate abstract syntax trees, and perform instance-based featurization using Calcite 1.27.0. The EMF model 142 is implemented using PyTorch 1.12 and employs the Adam optimizer with a learning rate of 10-3 and a weight decay of 5-4. The GEqO engine 110 trains using a dropout of 50% applied to all layers. The VMF is implemented using FAISS 1.7.2, where the GEqO engine 110 constructs a quantizer using 128-bit locality-sensitive hashes (LSH), an 128-dimension inverted index, and limit neighbor searches to a radius of d=1. Finally, the GEqO engine 110 sets the SSFL confidence level to $T_h$=0.9.

Experiments were conducted using a single machine with two CPU sockets (Intel Xeon Platinum 8272CL) each with 16 physical cores (32 with hyper-threading), 264 GB of main memory, and 1412 GB storage device. Our GPU-based experiments are executed on a single Nvidia Tesla T4 with 16 GB memory.

A set of base subexpressions was generated on the TPC-DS and TPC-H schema using AMOEBA augmented with rules from WeTune as the workload queries. The set of TPC-DS subexpressions comprises ~34 k queries, while the TPC-H dataset contains ~19 k queries.

Figure 5:
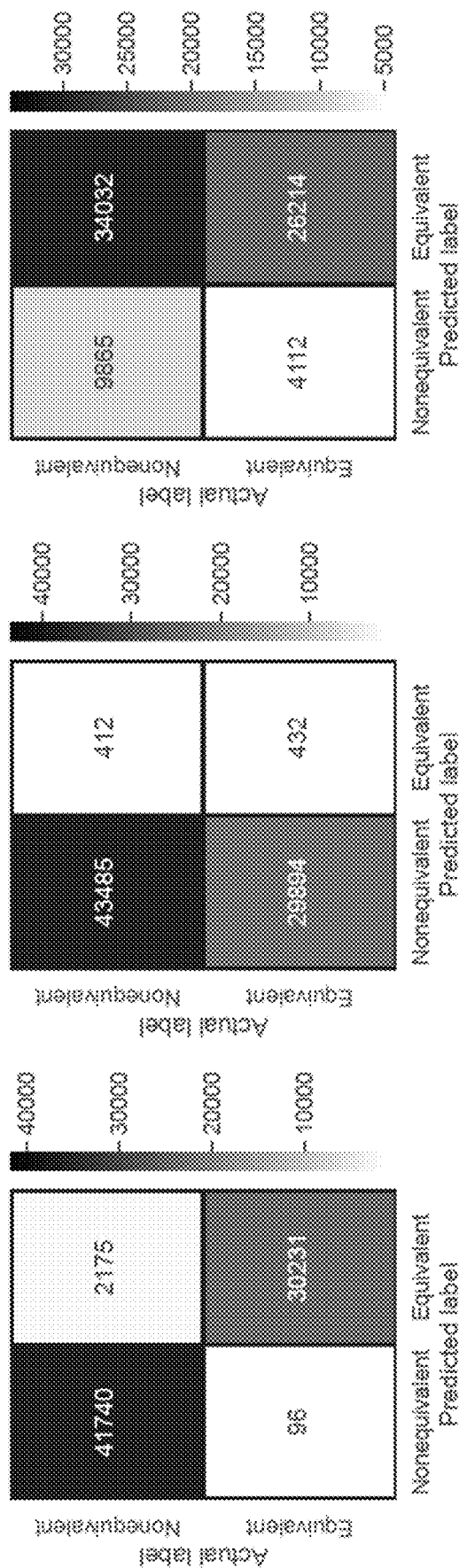
FIG. 5 shows confusion matrices for each model type, drilling down into how the prediction aligns with the ground truth for each model.

First evaluated is the performance of EMF model in terms of model architecture, computational cost, and ability to transfer to unseen workloads and database schema. This experiment compares the effectiveness of three candidate EMF classifiers: multi-layer perceptrons (MLP), random forests (RF), and logistic regression (LR). The three variants were trained on the TPC-H workload and measure performance on the TPC-DS dataset. The MLP model provides superior accuracy versus the simpler models. FIG. 5 shows confusion matrices for each model type, drilling down into how the prediction aligns with the ground truth for each model. Since the EMF 140 serves as a filter, it should be the one that strives to simultaneously minimize the false positives (e.g., a error in the top right quadrant) and false negatives (e.g., β error in the bottom left quadrant) of the prediction. Here, β error is most important, since the GEqO engine 110 always invokes the equivalence verifier to verify the predicated equivalence, false positives from the EMF model 142 do not affect the correctness of the GEqO engine 110, but represent wasted computation (e.g., by invoking the expensive automated verifier). By contrast, false negatives represent the missed equivalent queries by the EMF model 142 and thus should be minimized at all costs. Shown in FIG. 5, MLP is by far the clear winner in simultaneously minimizing the false positives and false negatives. In particular, the false negatives for MLP is kept around 0.1%, which is orders of magnitude smaller than the other two models. Due to the superiority of the MLP architecture to detect equivalence, all subsequent experiments in this section utilize this model.

Next analyzed is the training, prediction, and space costs of the EMF model 142 trained using the architecture described above averaged over five runs. The EMF is trained using ~47 k subexpression pairs drawn from the TPC-H dataset. On average, a training run with 20 epochs takes approximately 40 minutes. The size of the model 142 when serialized to disk is approximately 2.3 MB, including all the learned parameters. EMF prediction time is 0.00319 s per pair of subexpressions averaged over ~70 k random TPC-DS subexpression pairs.

Next discussed is the ability of the EMF to transfer to unseen datasets. Consider the following classifier performance result:

TABLE 3

Classifier performance (train TPC-H, test TPC-DS)

| Model Type | Accuracy | F1 |
|---|---|---|
| MLP | 0.970 | 0.964 |
| RF | 0.592 | 0.030 |
| LR | 0.588 | 0.486 |

First, note that the results shown in Table 3 and FIG. 5 already illustrate this ability, where the EMF model 142 is trained on the TPC-H workload and tested on TPC-DS workload. Next, five additional datasets were generated, ranging from approximately 1 k to 50 k on a random schema using the method described above. The EMF is then evaluated using the TPC-H-trained model and report model performance in Table 4:

TABLE 4

Transfer learning performance on randomly-generated schema

| Dataset Size | Precision | Recall | F1 |
|---|---|---|---|
| 1.2k | 0.94 | 0.99 | 0.97 |
| 5.0k | 0.93 | 0.98 | 0.97 |
| 11.0k | 0.90 | 0.96 | 0.94 |
| 19.9k | 0.93 | 0.97 | 0.95 |
| 44.9k | 0.88 | 0.96 | 0.94 |

The high performance on additional unseen datasets reinforces EMF's ability to easily adapt to new, unseen workloads.

In Table 5, the performance of the VMF filter is studied, which filters out "easy" equivalence cases before GEqO applies the EMF:

TABLE 5

Transfer learning performance on randomly-generated schema

| Accuracy | Precision | Recall | F1 |
|---|---|---|---|
| 0.74 | 0.42 | 0.98 | 0.60 |

As above, the VMF is evaluated by applying it to the TPC-DS workload. It is observed that the VMF is able to substantially reduce the search space and serves as an excellent filter prior to invoking the EMF.

In this experiment, the SSFL is also evaluated. To do so, iterative training is done on additional labeled samples to fine-tune the EMF model 142. This example filter-based sampling method is compared against random sampling.

Figure 6:
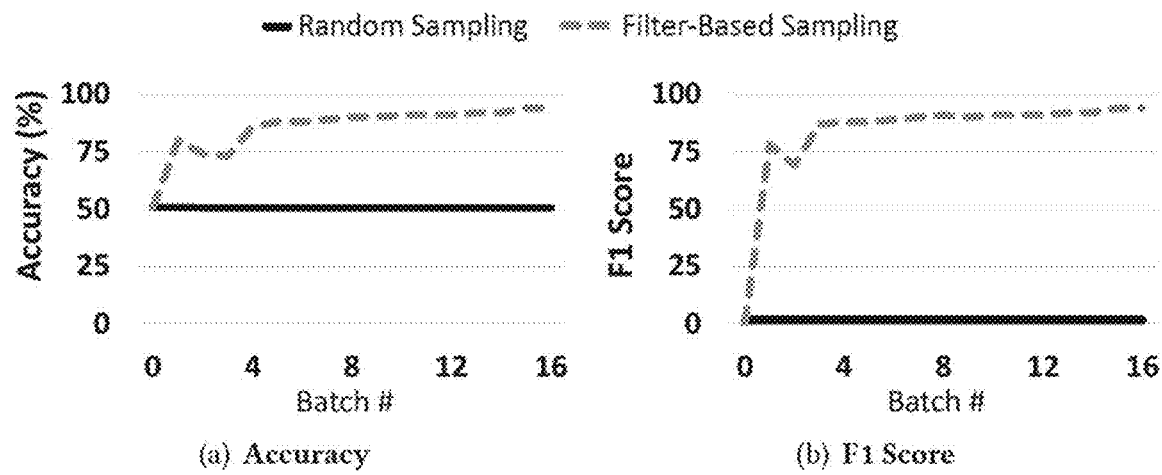
FIG. 6 and FIG. 7 show the accuracy and F1 score of the variants as they are exposed to additional labeled samples, and a result.

For this experiment, there is a scenario where the workload changes with new equivalent and non-equivalent patterns that the model has never seen before. It is expected that there is an initial model with low quality that improves with subsequent SSFL iterations. To model this, a degenerate TPC-H dataset is created by omitting all queries that contain joins. An initial model is trained on the degenerate dataset and test on the TPC-DS workload. FIG. 6 shows the accuracy and F1 score of the variants as they are exposed to additional labeled samples. Since the initial model has only been exposed to limited forms of equivalent and non-equivalent patterns, it does not perform well on the new workload which contains lots of subexpressions with joins. In each iteration of the feedback loop, 512 labeled samples are drawn, using either filter-based or random sampling, from the new workload to help improve the model. With random sampling, performance does not improve meaningfully. Due to the non-equivalence of most subexpressions in the workload, identifying positive examples through random sampling is nearly impossible. As a result, the accuracy and F1 score remain extremely low. By contrast, the filter-based sampling is more intelligent in selecting balanced samples that contain both positive and negative examples. This leads to significant improvements in both accuracy and F1 score. It takes only ~4 k samples to improve model accuracy and F1 score to 90%.

Figure 7:
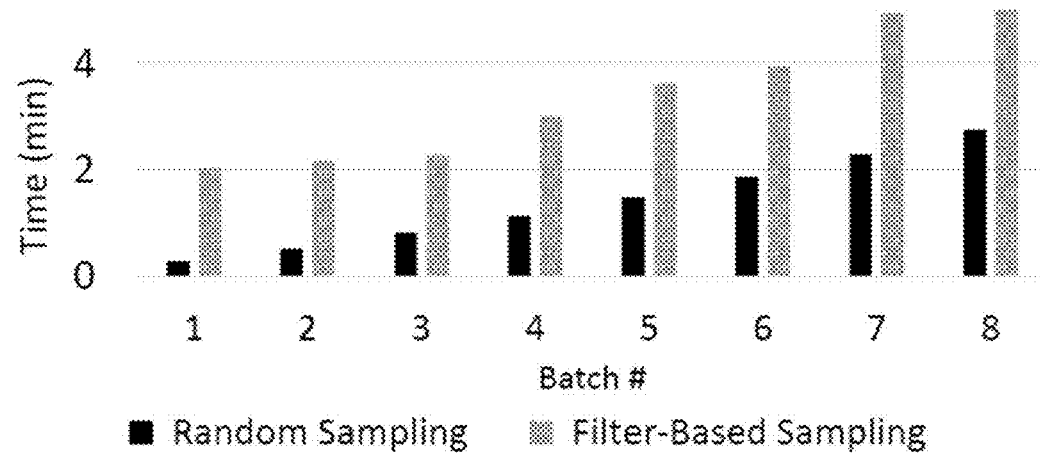

SSFL execution time at various batch sizes is next measured. FIG. 7 shows the result. Each bar in the figure shows the end-to-end SSFL runtime, including both the time for sampling and training. Obviously, the filter-based sampling is more expensive than random sampling since it needs to do extra work to identify likely equivalent subexpression pairs (e.g., by executing the SF and VMF filters and verifying). As shown in the figure, as more samples are trained over, the difference between the two reduces from 6.9× to less than 2×. At the same time, it's worth recalling that the filter-based sampling requires many fewer iterations to achieve a satisfactory model accuracy and F1 score. Additionally, the SSFL process may be performed out-of-band with model prediction and the improved model may be substituted after training, mitigating performance impact on the prediction path. Once a model has stabilized, the SSFL will no longer be active, and no further overhead will be incurred.

Figure 8:
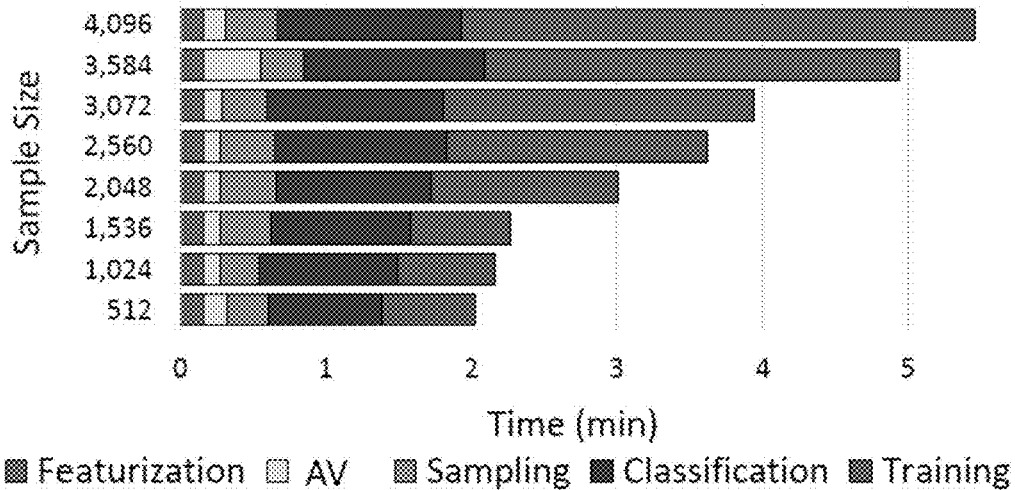
FIG. 8 shows the breakdown of the time for the feedback loop with filter-based sampling.

Finally, FIG. 8 shows the breakdown of the time for the feedback loop with filter-based sampling. As can be seen, the time spent in featurization, sampling, and verification is modest and does not substantially increase with batch size. On the other hand, the increase in training time is more dramatic and it quickly dominates SSFL runtime.

Above, the performance of the VMF and EMF are evaluated in terms of their ability to identify equivalences and eliminate non-equivalences. In the paragraphs below, the runtimes of each filter are examined. To do so, each filter is executed on increasingly large subsets of the TPC-DS dataset. Confounds are reduced by disabling all other filters and performance is compared using a CPU- and GPU-based implementation.

Figure 9:
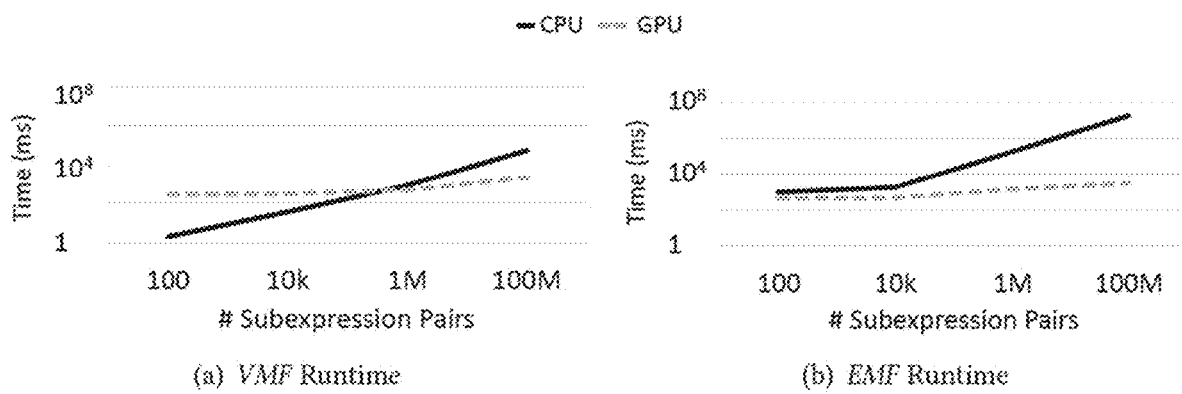
FIG. 9 and FIG. 10 show example performance graphs.
Figure 10:
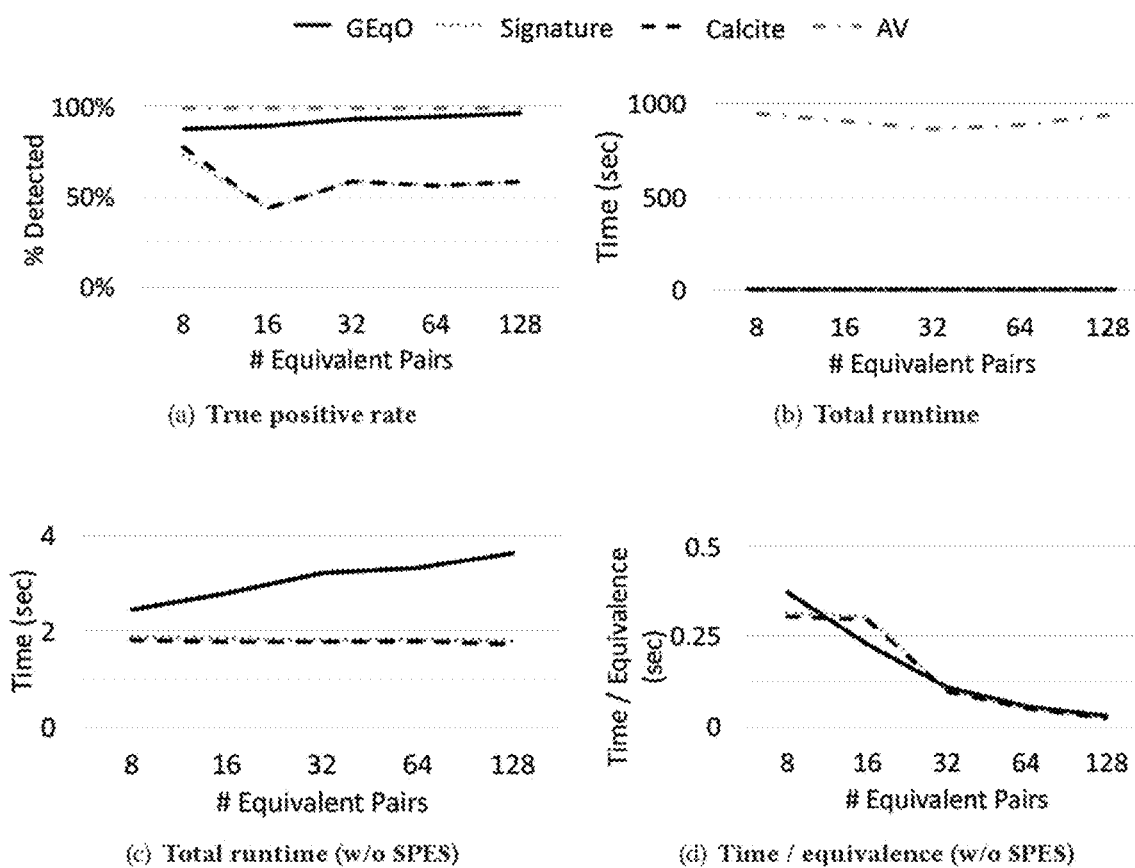

FIG. 9 and FIG. 10 show example performance graphs. In graph (a) of FIG. 9, it is observed that the CPU-based VMF exhibits excellent performance for smaller numbers of subexpression pairs, whereas the GPU-based variant surpasses it for ≥~1 million pairs due to a decrease in the proportion of data transfer I/O overheads in the overall runtime. In contrast, in graph (b), the EMF consistently shows superior performance with GPU-based execution, although the CPU variant performs well at lower numbers of pairs. These results highlight the flexibility of GEqO in targeting and adapting to heterogeneous hardware, providing a distinct advantage over other heuristic- and optimizer-based techniques.

The GEqO engine 110 performance is evaluated in detecting equivalent subexpression pairs in various workloads. To do so, a series of forty ~50 k pair datasets generated on the TPC-DS schema and unseen by the EMF model 142 are created. Each dataset is verified to contain approximately 8, 16, 32, 64, or 128 equivalent pairs, with at least five (or more) datasets at each equivalence count. The GEqO engine 110 is executed on each dataset by executing the $GEqO_{SET}$ (W, {SF, VMF, EMF}) process defined above, along with the baselines described below. For this experiment, it is assumed that the equivalences admitted by the AV constitute ground truth and the GEqO engine 110 has executed its SSFL and reached a confidence level above its minimum threshold ($T_h \geq 0.9$).

GEqO is compared against three baselines: (i) the SPES query equivalence solver; (ii) signature-based equivalence detection, which compares signatures computed on each subexpression's abstract syntax tree (AST); and (iii) an optimizer-based equivalence detection technique that leverages the Calcite optimizer to check whether two subexpressions are equivalent.

As shown in graph (a) of FIG. 10, the GEqO engine 110 identifies nearly all the semantic equivalences in the dataset (with a true positive rate averaging 88% across all datasets and equivalence rates), whereas the Calcite and signature-based techniques average far fewer. Unsurprisingly, SPES correctly verifies all equivalences. Next, graph (b) shows the runtimes for each method. SPES's runtime is more than 200× more expensive than the other methods. Graph (c) omits SPES and illustrates that the Calcite and signature-based methods have approximately constant runtimes across all datasets, whereas GEqO exhibits a curve that is similar at low numbers of equivalences and gradually rises for datasets with more equivalences. These plots demonstrate that GEqO is able to detect equivalences at an accuracy level near that of SPES but at a runtime similar to the heuristic-based techniques.

Finally, while graph (c) suggests a gradually rising runtime for the GEqO engine 110, this occurs because it detects more equivalences. Graph (d) plots the runtime per equivalence detected and demonstrates that the GEqO engine 110 spends approximately the same amount of time as Calcite and the signature-based method per equivalence. For scaling reasons, SPES values are not shown in this plot, which ranged from 13.8 to 118.2 seconds per identified equivalence.

Figure 11:
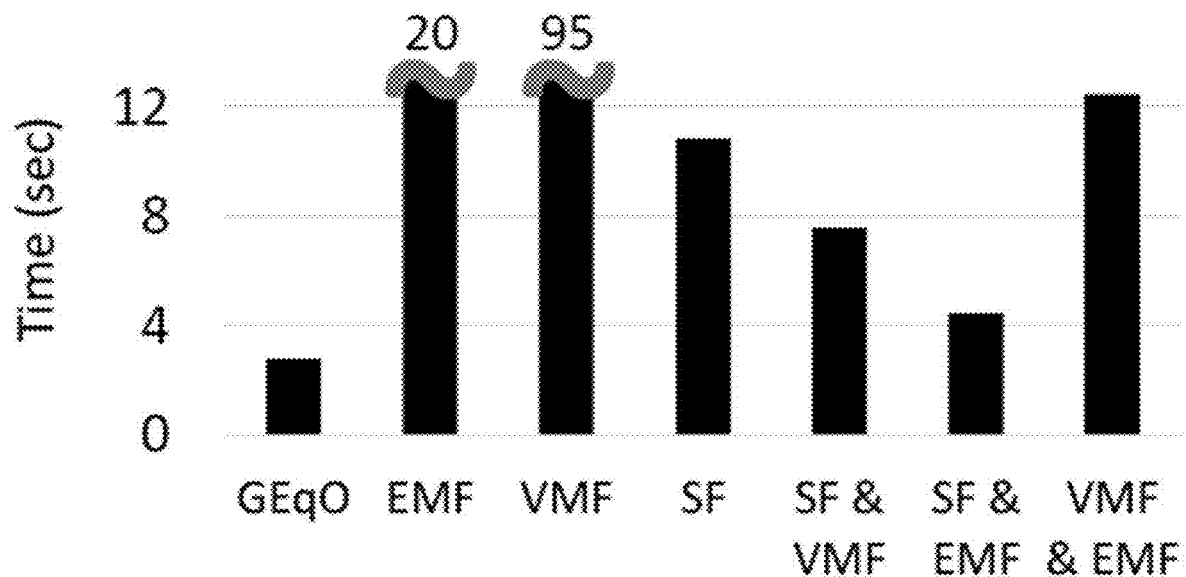
FIG. 11 shows the result of an experiment.

Next is the relative contribution of each GEqO filter. $GEqO_{SET}$(W, F) is executed by varying F to be some combination of the filters available in GEqO (e.g., the nonempty power set of {VMF, EMF, SF}) and W to be each of the 32-equivalence datasets described above. Mean runtime over evaluated workloads is reported, including verification time of the filtered pairs. FIG. 11 shows the result of this experiment. As shown, GEqO achieves best performance only when applying all filters; no other combination minimizes the total runtime. This implies that GEqO's filters are complimentary to each other, and not redundantly filtering the same sets of subexpression pairs.

In another experiment, it is evaluated how GEqO can be utilized in a result caching or materialization application, where results of queries are cached under a storage budget, to save computation for future semantically-equivalent queries. Using the workload from § 7 on the 100 GB TPC-DS dataset, approximately ~23 k unique expressions are obtained, after excluding those that produce empty results.

Figure 12:
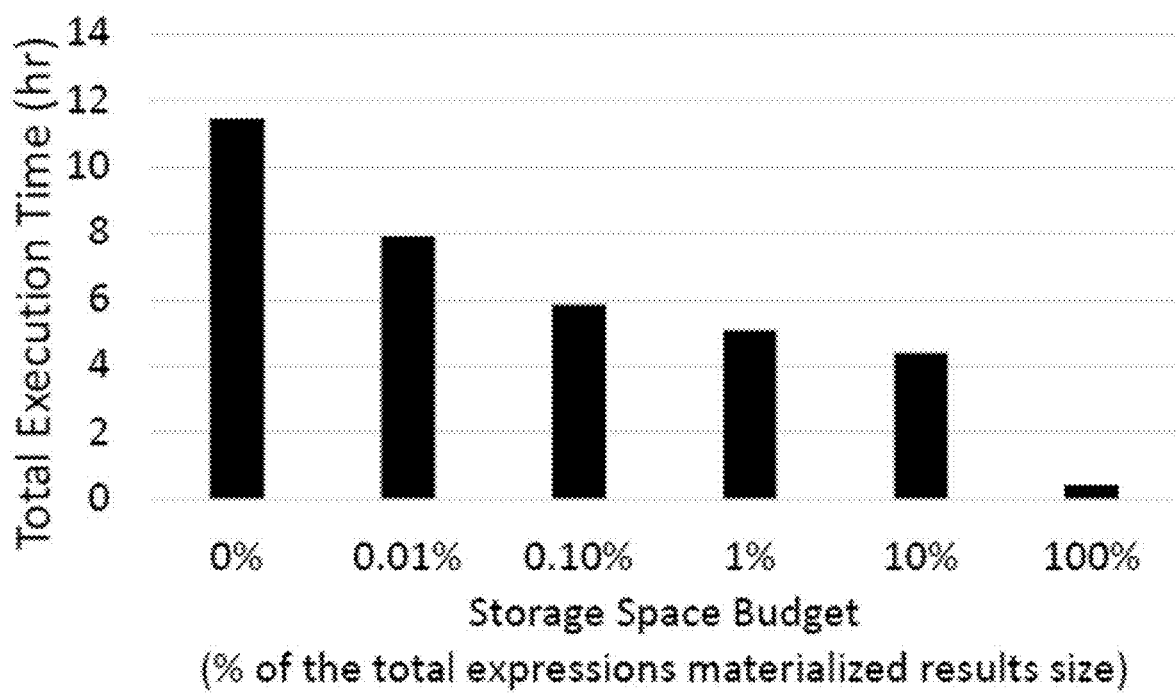
FIG. 12 shows performance results.

Our experiment assumes no updates. When executing with unlimited storage budget, the result cache using GEqO could materialize the first occurrence of each equivalent expression (there are 5,277 equivalence classes in the workload), resulting in a total of ~2 GB storage space (in this workload, the expressions are computationally expensive but return small results), which is used as the upper-bound for our storage budget. The storage budget for the cache is varied, and a caching policy that materializes the most expensive queries (leveraging past runtime statistics) is simulated. FIG. 12 shows performance results. More specifically, FIG. 12 shows a reduction of up to 61.5% in the total workload execution time (running on a modern commercial database system), with 10% of storage budget. With 100% storage budget, a total of 96.2% computation reduction is achieved.

Figure 13:
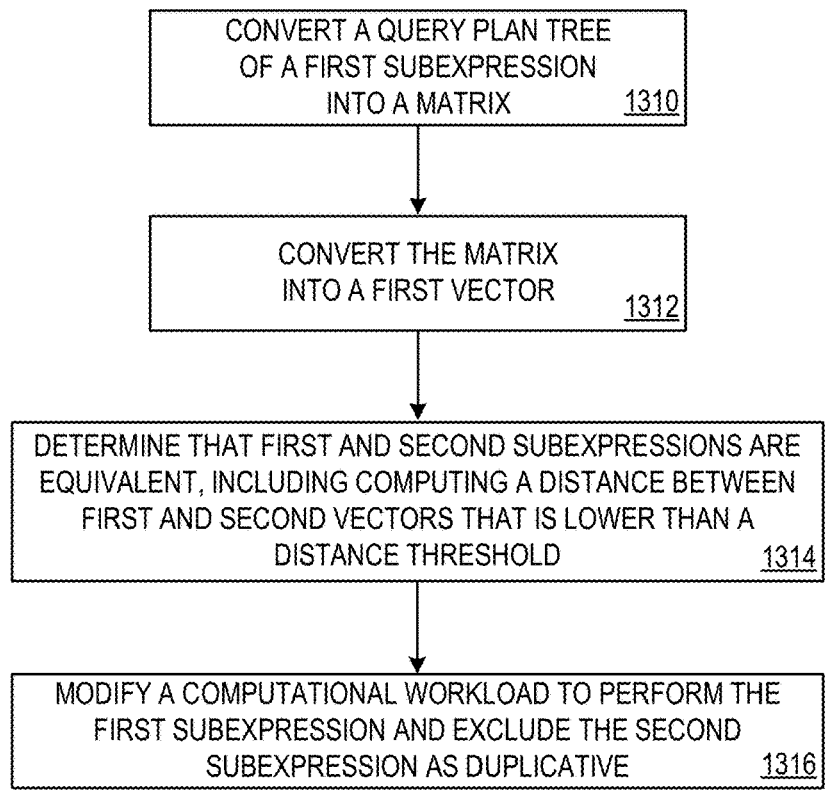
FIG. 13 is a flow chart 1300 of an example method for detecting equivalent subexpressions within a computational workload.

FIG. 13 is a flow chart 1300 of an example method for detecting equivalent subexpressions within a computational workload. In examples, the method is performed by the GEqO engine 110 and/or any of the modules 120, 130, 140, 160, and these operations may be similar to the operations shown and described in relation to FIG. 1 to FIG. 3B. In this example, at operation 1310, the VMF 130 converts a query plan tree (e.g., logical plans 310, db-agnostic plans 320, graph 400) associated with a first subexpression into a matrix, the first subexpression being a portion of a database query from the computational workload (e.g., workload 102), each node (e.g., nodes 410A-410D) in the query plan tree being represented as a row of the matrix.

In the example, at operation 1312, the VMF 130 converts the matrix into a first vector. At operation 1314, the VMF 130 determines that the first subexpression is equivalent to a second subexpression by comparing the first vector to a second vector associated with the second subexpression, the comparing including computing a distance between the first and second vectors that is lower than a predefined distance threshold. In some examples, the first vector and the second vector are identified for the comparing based on an approximate nearest neighbor search (ANNS) of the first vector over a plurality of vectors, the ANNS identifying the second vector. At operation 1316, the VMF 130 also modifies the computational workload, based on the determining, to perform the first subexpression and exclude performance of the second subexpression as duplicative.

In some examples, the query plan tree is initially an instance-based encoding (e.g., logical plan 310), the instance-based encoding including references to components of a particular database instance, and the VMF 130 also converts the query plan tree to a database-agnostic encoding (e.g., db-agnostic plan 320) by replacing one or more of (a) instance table names with generic table names and (b) instance column names with generic column names.

In some examples, the VMF 130 also performs schema filtration analysis on the first and second subexpressions, the schema filtration analysis compares, within the first and second subexpressions, one or more of (i) database tables referenced and (ii) a number of database columns returned, the schema filtration analysis does not identify the first and second subexpressions as equivalent. In some examples, the VMF 130 also groups the first and second subexpressions into a first group based at least in part on the first and second subexpressions referencing the same set of tables, wherein comparing the first vector to a second vector is performed when the first and second subexpressions are members of the first group.

In some examples, the VMF 130 also trains a model (e.g., EMF model 142) to predict semantic equivalence between two subexpressions, and inputs a third and a fourth subexpression to the model to determine that the third and fourth subexpressions are equivalent. In some examples, the VMF 130 also verifies that the first and second subexpressions are equivalent using an automated verifier after the determining.

Additional Examples

An example equivalence detection system comprises: a processor; and a memory comprising computer-readable instructions, the processor, the memory and the computer-readable instructions configured to cause the processor to: convert a query plan tree associated with a first subexpression into a matrix, the first subexpression being a portion of a database query from a computational workload, each node in the query plan tree being represented as a row of the matrix; convert the matrix into a first vector of a predetermined length; determine that the first subexpression is equivalent to a second subexpression based on comparing the first vector to a second vector associated with the second subexpression, the comparing including computing a distance between the first and second vectors that is lower than a predefined distance threshold; and alter the computational workload, based on the determining, to perform the first subexpression and exclude performance of the second subexpression as duplicative.

An example computer-implemented method for detecting equivalent subexpressions within a computational workload comprises: converting a query plan tree associated with a first subexpression into a matrix, the first subexpression being a portion of a database query from the computational workload, each node in the query plan tree being represented as a row of the matrix; converting the matrix into a first vector; determining that the first subexpression is equivalent to a second subexpression by comparing the first vector to a second vector associated with the second subexpression, the comparing including computing a distance between the first and second vectors that is lower than a predefined distance threshold; and modifying the computational workload, based on the determining, to perform the first subexpression and exclude performance of the second subexpression as duplicative.

An example computer storage medium has computer-executable instructions that, upon execution by a processor of a computer, cause the processor to at least: convert a query plan tree associated with a first subexpression into a matrix, the first subexpression being a portion of a database query from a computational workload, each node in the query plan tree being represented as a row of the matrix; convert the matrix into a first vector of a predetermined length; determine that the first subexpression is equivalent to a second subexpression based on comparing the first vector to a second vector associated with the second subexpression, the comparing including computing a distance between the first and second vectors that is lower than a predefined distance threshold; and alter the computational workload, based on the determining, to perform the first subexpression and exclude performance of the second subexpression as duplicative.

Alternatively, or in addition to the other examples described herein, examples include any combination of the following:
- converting a query plan tree associated with a first subexpression into a matrix;
- a first subexpression being a portion of a database query from the computational workload;
- each node in a query plan tree being represented as a row of the matrix;
- converting the matrix into a first vector;
- determining that the first subexpression is equivalent to a second subexpression by comparing the first vector to a second vector associated with the second subexpression;
- comparing including computing a distance between the first and second vectors that is lower than a predefined distance threshold;
- modifying the computational workload, based on the determining, to perform the first subexpression and exclude performance of the second subexpression as duplicative;
- the query plan tree is initially an instance-based encoding;
- instance-based encoding including references to components of a particular database instance;
- converting the query plan tree to a database-agnostic encoding by replacing one or more of (a) instance table names with generic table names and (b) instance column names with generic column names;
- a first vector and the second vector are identified for the comparing based on an approximate nearest neighbor search (ANNS) of the first vector over a plurality of vectors, the ANNS identifying the second vector;
- performing schema filtration analysis on the first and second subexpressions;
- a schema filtration analysis compares, within the first and second subexpressions, one or more of (i) database tables referenced and (ii) a number of database columns returned, the schema filtration analysis does not identify the first and second subexpressions as equivalent;
- performing schema filtration analysis before determining that two subexpressions are equivalent based on comparing vectors associated with the subexpressions;
- perform schema filtration analysis on the first and second subexpressions before the determining that the first subexpression is equivalent to the second subexpression based on comparing the first vector to the second vector, the schema filtration analysis compares, within the first and second subexpressions, one or more of (i) database tables referenced and (ii) a number of database columns returned, the schema filtration analysis does not identify the first and second subexpressions as equivalent;
- grouping the first and second subexpressions into a first group based at least in part on the first and second subexpressions referencing the same set of tables;
- comparing the first vector to a second vector is performed when the first and second subexpressions are members of the first group;
- training a model to predict semantic equivalence between two subexpressions;
- inputting a third and a fourth subexpression to the model to determine that the third and fourth subexpressions are equivalent;
- inputting third and fourth subexpressions to the model after determining that the third and fourth subexpressions are determined not to be equivalent;
- inputting third and fourth subexpressions to the model after determining that the third and fourth subexpressions are determined not to be equivalent based on a distance comparison between third and fourth vectors associated with the third and fourth subexpressions;
- verifying that the first and second subexpressions are equivalent using an automated verifier after the determining;
- performing db-agnostic encoding on an instance-based representation of a plan to generate a db-agnostic representation;

performing tree convolutions using a machine learning model;

performing VMF filtration for subexpressions within an SF-group;

generating a query tree plan for a subexpression;

featurize and vectorize each node in a query tree plan;

traverse a query tree plan, stacking feature vectors to form a matrix;

convert the matrix into a fixed-length vector;

each subexpression has a fixed-length vector in a vector space;

determine a distance between two pairs of vectors;

for each pair in a group, determine a distance between the pairs; and identify a pair as equivalent when the distance between vectors is below a predetermined threshold.

While the aspects of the disclosure have been described in terms of various examples with their associated operations, a person skilled in the art would appreciate that a combination of operations from any number of different examples is also within scope of the aspects of the disclosure.

Exemplary Operating Environment

Figure 14:
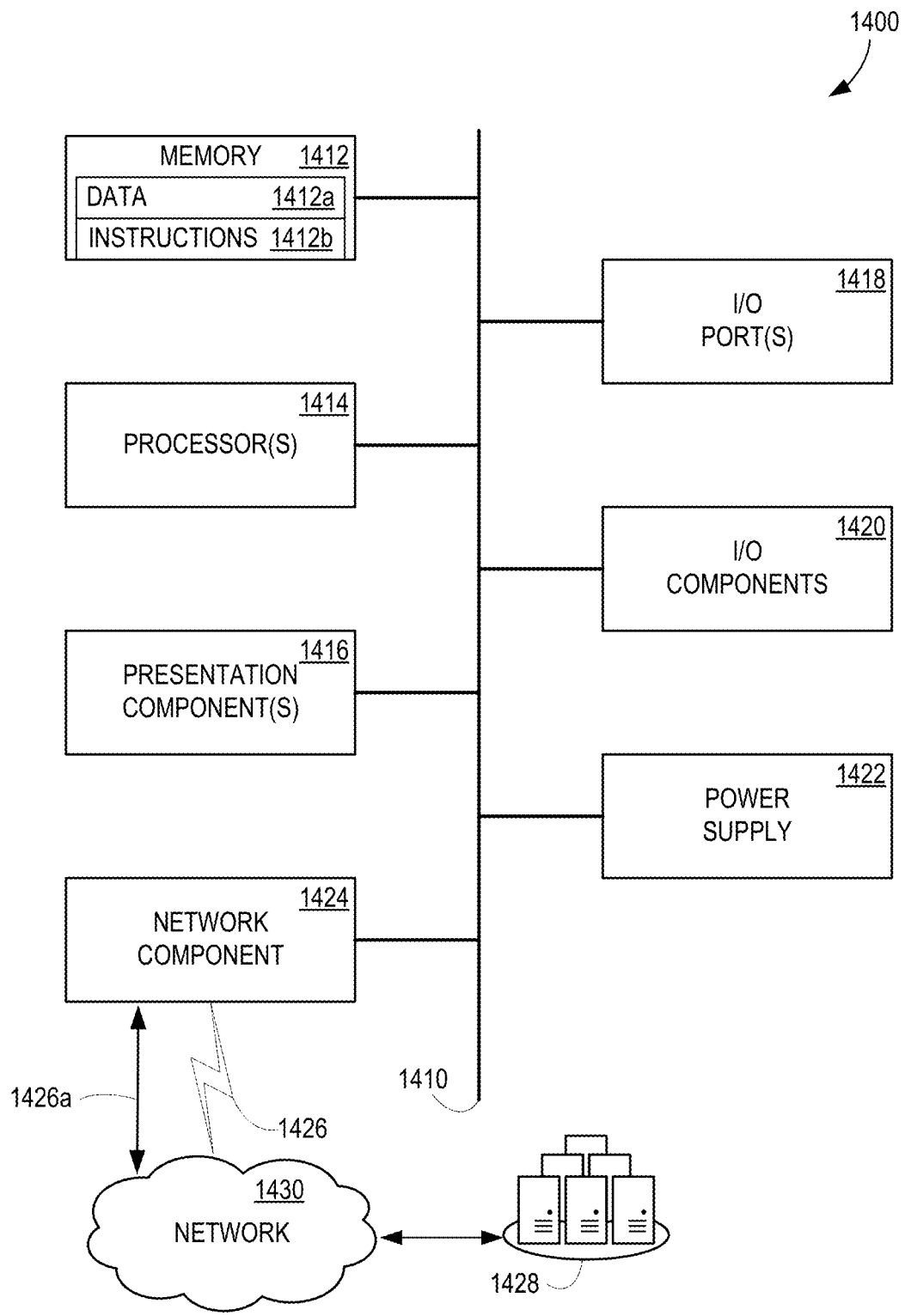
FIG. 14 is a block diagram of an example computing device (e.g., a computer storage device) for implementing aspects disclosed herein, and is designated generally as computing device.

FIG. 14 is a block diagram of an example computing device 1400 (e.g., a computer storage device) for implementing aspects disclosed herein, and is designated generally as computing device 1400. In some examples, one or more computing devices 1400 are provided for an on-premises computing solution. In some examples, one or more computing devices 1400 are provided as a cloud computing solution. In some examples, a combination of on-premises and cloud computing solutions are used. Computing device 1400 is but one example of a suitable computing environment that can be used in system 100 (e.g., as GEqO device 110) and is not intended to suggest any limitation as to the scope of use or functionality of the examples disclosed herein, whether used singly or as part of a larger set. Neither should computing device 1400 be interpreted as having any dependency or requirement relating to any one or combination of components/modules illustrated.

The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1400 includes a bus 1410 that directly or indirectly couples the following devices: computer storage memory 1412, one or more processors 1414, one or more presentation components 1416, input/output (I/O) ports 1418, I/O components 1420, a power supply 1422, and a network component 1424. While computing device 1400 is depicted as a seemingly single device, multiple computing devices 1400 may work together and share the depicted device resources. For example, memory 1412 may be distributed across multiple devices, and processor(s) 1414 may be housed with different devices.

Bus 1410 represents what may be one or more busses (such as an address bus, data bus, or a combination thereof). Although the various blocks of FIG. 5 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 5 and the references herein to a "computing device." Memory 1412 may take the form of the computer storage media referenced below and operatively provide storage of computer-readable instructions, data structures, program modules and other data for the computing device 1400. In some examples, memory 1412 stores one or more of an operating system, a universal application platform, or other program modules and program data. Memory 1412 is thus able to store and access data 1412a and instructions 1412b that are executable by processor 1414 and configured to carry out the various operations disclosed herein.

In some examples, memory 1412 includes computer storage media. Memory 1412 may include any quantity of memory associated with or accessible by the computing device 1400. Memory 1412 may be internal to the computing device 1400 (as shown in FIG. 5), external to the computing device 1400 (not shown), or both (not shown). Additionally, or alternatively, the memory 1412 may be distributed across multiple computing devices 1400, for example, in a virtualized environment in which instruction processing is carried out on multiple computing devices 1400. For the purposes of this disclosure, "computer storage media," "computer-storage memory," "memory," and "memory devices" are synonymous terms for the computer-storage memory 1412, and none of these terms include carrier waves or propagating signaling.

Processor(s) 1414 may include any quantity of processing units that read data from various entities, such as memory 1412 or I/O components 1420. Specifically, processor(s) 1414 are programmed to execute computer-executable instructions for implementing aspects of the disclosure. The instructions may be performed by the processor, by multiple processors within the computing device 1400, or by a processor external to the client computing device 1400. In some examples, the processor(s) 1414 are programmed to execute instructions such as those illustrated in the flow charts discussed below and depicted in the accompanying drawings. Moreover, in some examples, the processor(s) 1414 represents an implementation of analog techniques to perform the operations described herein. For example, the operations may be performed by an analog client computing device 1400 and/or a digital client computing device 1400. Presentation component(s) 1416 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1400, across a wired connection, or in other ways. I/O ports 1418 allow computing device 1400 to be logically coupled to other devices including I/O components 1420, some of which may be built in. Example I/O components 1420 include, for example but without limitation, a microphone, joystick, game pad, satellite dish, scanner, printer, wireless device, etc.

Computing device 1400 may operate in a networked environment via the network component 1424 using logical connections to one or more remote computers. In some examples, the network component 1424 includes a network interface card and/or computer-executable instructions (e.g., a driver) for operating the network interface card. Communication between the computing device 1400 and other devices may occur using any protocol or mechanism over any wired or wireless connection. In some examples, network component 1424 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1424 communicates over wireless communication link 1426 and/or a wired communication link 1426a to a remote resource 1428 (e.g., a cloud resource) across network 1430. Various different examples of communication links 1426 and 1426a include a wireless connection, a wired connection, and/or a dedicated link, and in some examples, at least a portion is routed through the internet.

Although described in connection with an example computing device 1400, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure do not include signals. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An equivalence detection system comprising:
    a processor; and
    a memory comprising computer-readable instructions, the processor, the memory and the computer-readable instructions configured to cause the processor to:
        convert a query plan tree associated with a first subexpression into a matrix, the first subexpression being a portion of a database query from a computational workload, a node in the query plan tree being represented as a row of the matrix;
convert the matrix into a first vector of a predetermined length;
determine that the first subexpression is equivalent to a second subexpression based on comparing the first vector to a second vector associated with the second subexpression, the comparing including computing a distance between the first and second vectors that is lower than a distance threshold; and
alter the computational workload, based on the determining, to perform the first subexpression and exclude performance of the second subexpression as duplicative.

2. The equivalence detection system of claim 1, wherein the computer-readable instructions are further configured to cause the processor to:
generate the query plan tree for the first subexpression as an instance-based encoding, the instance-based encoding including references to components of a particular database instance; and
convert the query plan tree to a database-agnostic encoding by replacing one or more of (a) instance table names with generic table names and (b) instance column names with generic column names.

3. The equivalence detection system of claim 1, wherein the first vector and the second vector are identified for the comparing based on an approximate nearest neighbor search (ANNS) of the first vector over a plurality of vectors, the ANNS identifying the second vector.

4. The equivalence detection system of claim 1, wherein the computer-readable instructions are further configured to cause the processor to perform schema filtration analysis on the first and second subexpressions before the determining that the first subexpression is equivalent to the second subexpression based on comparing the first vector to the second vector, the schema filtration analysis compares, within the first and second subexpressions, one or more of (i) database tables referenced and (ii) a number of database columns returned, the schema filtration analysis does not identify the first and second subexpressions as equivalent.

5. The equivalence detection system of claim 4, wherein the computer-readable instructions are further configured to cause the processor to group the first and second subexpressions into a first group based at least in part on the first and second subexpressions referencing the same set of tables, wherein comparing the first vector to a second vector is performed when the first and second subexpressions are members of the first group.

6. The equivalence detection system of claim 1, wherein the computer-readable instructions are further configured to cause the processor to:
train a model to predict semantic equivalence between two subexpressions; and
after a third subexpression and a fourth subexpression are determined not to be equivalent based on a distance comparison between third and fourth vectors associated with the third and fourth subexpressions, input the third and a fourth subexpressions to the model to determine that the third and fourth subexpressions are equivalent.

7. The equivalence detection system of claim 1, wherein the computer-readable instructions are further configured to cause the processor to verify that the first and second subexpressions are equivalent using an automated verifier after the determining.

8. A computer-implemented method for detecting equivalent subexpressions within a computational workload, the method comprising:
converting a query plan tree associated with a first subexpression into a matrix, the first subexpression being a portion of a database query from the computational workload, each node in the query plan tree being represented as a row of the matrix;
converting the matrix into a first vector;
determining that the first subexpression is equivalent to a second subexpression by comparing the first vector to a second vector associated with the second subexpression, the comparing including computing a distance between the first and second vectors that is lower than a distance threshold; and
modifying the computational workload, based on the determining, to perform the first subexpression and exclude performance of the second subexpression as duplicative.

9. The computer-implemented method of claim 8, wherein the query plan tree is initially an instance-based encoding, the instance-based encoding including references to components of a particular database instance, the method further comprising converting the query plan tree to a database-agnostic encoding by replacing one or more of (a) instance table names with generic table names and (b) instance column names with generic column names.

10. The computer-implemented method of claim 8, wherein the first vector and the second vector are identified for the comparing based on an approximate nearest neighbor search (ANNS) of the first vector over a plurality of vectors, the ANNS identifying the second vector.

11. The computer-implemented method of claim 8, further comprising performing schema filtration analysis on the first and second subexpressions before the determining that the first subexpression is equivalent to the second subexpression based on comparing the first vector to the second vector, the schema filtration analysis compares, within the first and second subexpressions, one or more of (i) database tables referenced and (ii) a number of database columns returned, the schema filtration analysis does not identify the first and second subexpressions as equivalent.

12. The computer-implemented method of claim 11, further comprising grouping the first and second subexpressions into a first group based at least in part on the first and second subexpressions referencing the same set of tables, wherein comparing the first vector to a second vector is performed when the first and second subexpressions are members of the first group.

13. The computer-implemented method of claim 8, further comprising:
training a model to predict semantic equivalence between two subexpressions; and
after a third subexpression and a fourth subexpression are determined not to be equivalent based on a distance comparison between third and fourth vectors associated with the third and fourth subexpressions, inputting the third and fourth subexpressions to the model to determine that the third and fourth subexpressions are equivalent.

14. The computer-implemented method of claim 8, further comprising verifying that the first and second subexpressions are equivalent using an automated verifier after the determining.

15. A computer storage medium having computer-executable instructions that, upon execution by a processor of a computer, cause the processor to at least:

convert a query plan tree associated with a first subexpression into a matrix, the first subexpression being a portion of a database query from a computational workload, each node in the query plan tree being represented as a row of the matrix;

convert the matrix into a first vector of a predetermined length;

determine that the first subexpression is equivalent to a second subexpression based on comparing the first vector to a second vector associated with the second subexpression, the comparing including computing a distance between the first and second vectors that is lower than a distance threshold; and alter the computational workload, based on the determining, to perform the first subexpression and exclude performance of the second subexpression as duplicative.

16. The computer storage medium of claim 15, wherein the computer-executable instructions are further configured to cause the processor to:

generate the query plan tree for the first subexpression as an instance-based encoding, the instance-based encoding including references to components of a particular database instance; and convert the query plan tree to a database-agnostic encoding by replacing one or more of (a) instance table names with generic table names and (b) instance column names with generic column names.

17. The computer storage medium of claim 15, wherein the first vector and the second vector are identified for the comparing based on an approximate nearest neighbor search (ANNS) of the first vector over a plurality of vectors, the ANNS identifying the second vector.

18. The computer storage medium of claim 15, wherein the computer-executable instructions are further configured to cause the processor to perform schema filtration analysis on the first and second subexpressions before the determining that the first subexpression is equivalent to the second subexpression based on comparing the first vector to the second vector, the schema filtration analysis compares, within the first and second subexpressions, one or more of (i) database tables referenced and (ii) a number of database columns returned, the schema filtration analysis does not identify the first and second subexpressions as equivalent.

19. The computer storage medium of claim 18, wherein the computer-executable instructions are further configured to cause the processor to group the first and second subexpressions into a first group based at least in part on the first and second subexpressions referencing the same set of tables, wherein comparing the first vector to a second vector is performed when the first and second subexpressions are members of the first group.

20. The computer storage medium of claim 15, wherein the computer-executable instructions are further configured to cause the processor to:

train a model to predict semantic equivalence between two subexpressions; and after a third subexpression and a fourth subexpression are determined not to be equivalent based on a distance comparison between third and fourth vectors associated with the third and fourth subexpressions, input the third and fourth subexpressions to the model to determine that the third and fourth subexpressions are equivalent.

* * * * *